United States Patent
Kang

(10) Patent No.: US 12,535,979 B2
(45) Date of Patent: Jan. 27, 2026

(54) IMAGE DISPLAY APPARATUS FOR DISPLAYING AN IMAGE RECEIVED FROM EXTERNAL DEVICE

(71) Applicant: LG ELECTRONICS INC., Seoul (KR)

(72) Inventor: Heechen Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/652,451

(22) Filed: May 1, 2024

(65) Prior Publication Data

US 2025/0060921 A1  Feb. 20, 2025

(30) Foreign Application Priority Data

Aug. 18, 2023 (KR) ................. 10-2023-0108350

(51) Int. Cl.
*G06F 3/14* (2006.01)
*H04N 19/44* (2014.01)

(52) U.S. Cl.
CPC ............... *G06F 3/14* (2013.01); *H04N 19/44* (2014.11)

(58) Field of Classification Search
CPC ........................................................ G06F 3/14
See application file for complete search history.

(56) References Cited

U.S. PATENT DOCUMENTS

| | | | |
|---|---|---|---|
| 2009/0041385 A1* | 2/2009 | Watanabe | H04N 19/127 382/298 |
| 2009/0278984 A1* | 11/2009 | Suzuki | H04N 7/081 348/554 |
| 2017/0012798 A1* | 1/2017 | Teramoto | H04L 12/4035 |
| 2020/0359085 A1* | 11/2020 | Tsutsui | H04B 7/0456 |
| 2023/0305785 A1* | 9/2023 | Park | H04N 21/485 |

FOREIGN PATENT DOCUMENTS

| | | |
|---|---|---|
| KR | 10-2014-0046902 | 4/2014 |
| KR | 10-2014-0094133 | 7/2014 |
| KR | 10-2017-0006870 | 1/2017 |
| KR | 10-2017-0057793 | 5/2017 |

OTHER PUBLICATIONS

Korean Intellectual Property Office Application No. 10-2023-0108350, Office Action dated Jan. 30, 2025, 2 pages.

* cited by examiner

*Primary Examiner* — Gustavo Polo
(74) *Attorney, Agent, or Firm* — LEE, HONG, DEGERMAN, KANG & WAIMEY

(57) ABSTRACT

The present disclosure relates to an image display apparatus. An image display apparatus according to one embodiment of the present disclosure comprises a display, an interface configured to exchange data with an external device, a memory configured to store a plurality of display identification data, and a signal processing device configured to transmit the plurality of display identification data to the external device at the time of connecting to the external device or changing an image output mode, decode image data received from the external device using a plurality of decoders, and select one of a plurality of decoded image data to be output on the display. Accordingly, an image may be stably displayed based on image data received from an external device.

14 Claims, 18 Drawing Sheets

IMAGE DISPLAY APPARATUS FOR DISPLAYING AN IMAGE RECEIVED FROM EXTERNAL DEVICE

CROSS-REFERENCE TO RELATED APPLICATION(S)

Pursuant to 35 U.S.C. § 119 (a), this application claims the benefit of earlier filing date and right of priority to Korean Patent Application No. 10-2023-0108350, filed on Aug. 18, 2023, the contents of which are all hereby incorporated by reference herein in their entireties.

BACKGROUND

1. Field

The present disclosure relates to an image display apparatus, and more particularly, to an image display apparatus capable of stably displaying an image based on image data received from an external device.

2. Description of the Related Art

An image display apparatus is an apparatus that displays images.

Meanwhile, being connected to an external device, an image display apparatus may display an image input from the external device.

For example, in case in which the image display apparatus is connected to the external device through a cable, the image display apparatus may transmit display identification data to the external device, and the external device may transmit an image signal matching the resolution indicated by the display identification data to the image display apparatus.

Meanwhile, in case in which the type, version, or format of received display identification data transmitted to the external device does not match the image signal that may be transmitted from the external device, a problem may arise that at least a portion of the image from the external device displayed on the image display apparatus becomes damaged.

SUMMARY

An object of the present disclosure is to provide an image display apparatus capable of stably displaying an image based on image data received from an external device.

Meanwhile, another object of the present disclosure is to provide an image display apparatus capable of transmitting display identification data corresponding to image data transmitted from an external device.

To achieve the objects above, an image display apparatus according to one embodiment of the present disclosure comprises a display, an interface configured to exchange data with an external device, a memory configured to store a plurality of display identification data, and a signal processing device configured to transmit the plurality of display identification data to the external device at the time of connecting to the external device or changing an image output mode, decode image data received from the external device using a plurality of decoders, and select one of a plurality of decoded image data to be output on the display.

Meanwhile, the signal processing device may be configured to sequentially transmit a plurality of display identification data to the external device through the interface.

Meanwhile, the signal processing device may be configured to extract data sizes respectively from a plurality of decoded image data, select decoded image data with the largest data size among the extracted data sizes, and output the selected decoded image data to the display.

Meanwhile, in case in which first image data of first resolution are received from the external device, the signal processing device may be configured to decode the first image data using the plurality of decoders, select a first decoder among the plurality of decoders based on a plurality of decoded image data, and output image data output from the first decoder to the display.

Meanwhile, in case in which second image data of second resolution are received from the external device, the signal processing device may be configured to decode the second image data using the plurality of decoders, select a second decoder among the plurality of decoders based on a plurality of decoded image data, and output image data output from the second decoder to the display.

Meanwhile, in case in which third image data of third resolution are received from the external device, the signal processing device may be configured to decode the third image data using the plurality of decoders, select a third decoder among the plurality of decoders based on a plurality of decoded image data, and output image data output from the third decoder to the display.

Meanwhile, in case in which the image output mode is changed from a normal color mode to a deep color mode or from the deep color mode to the normal color mode, the signal processing device may be configured to sequentially transmit a plurality of display identification data to the external device.

Meanwhile, in case in which the image output mode is changed from a normal mode to a game mode or from the game mode to the normal mode, the signal processing device may be configured to sequentially transmit a plurality of display identification data to the external device.

Meanwhile, in case in which image data received from the external device is decoded through a first decoder corresponding to first resolution, and resolution of decoded image data is lower than a first reference value corresponding to the first resolution, the signal processing device may be configured to transmit the plurality of display identification data to the external device.

Meanwhile, in case in which image data received from the external device is decoded through a first decoder corresponding to first resolution, and resolution of decoded image data is lower than a first reference value corresponding to the first resolution, the signal processing device may be configured to decode image data received from the external device through a second decoder corresponding to second resolution.

Meanwhile, in case in which resolution of image data decoded by the second decoder is lower than a second reference value corresponding to the second resolution, the signal processing device may decode image data received from the external device through a third decoder corresponding to third resolution.

Meanwhile, the interface may sequentially transmit a plurality of display identification data to the external device through a display data channel line.

Meanwhile, after sequentially transmitting a plurality of display identification data, the interface may receive image data from the external device through a plurality of Transition Minimized Differential Signaling (TMDS) lines.

An image display apparatus according to another embodiment of the present disclosure comprises a display, an interface configured to exchange data with an external device, a memory configured to store a plurality of display identification data, and a signal processing device configured to sequentially transmit the plurality of display identification data to the external device, receive image data corresponding to one of display identification data among the plurality of display identification data from the external device, and display an image corresponding to the received image data on the display.

Meanwhile, the signal processing device may be configured to select a first decoder among a plurality of decoders in case in which first image data of first resolution are received from an external device and output image data output from the first decoder on the display.

Meanwhile, the signal processing device may be configured to select a second decoder among a plurality of decoders in case in which second image data of second resolution are received from an external device and output image data output from the second decoder on the display.

Meanwhile, the signal processing device may be configured to select a third decoder among a plurality of decoders in case in which third image data of third resolution are received from an external device and output image data output from the third decoder on the display.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, the present disclosure will be described in detail with reference to the accompanying drawings.

Regarding constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
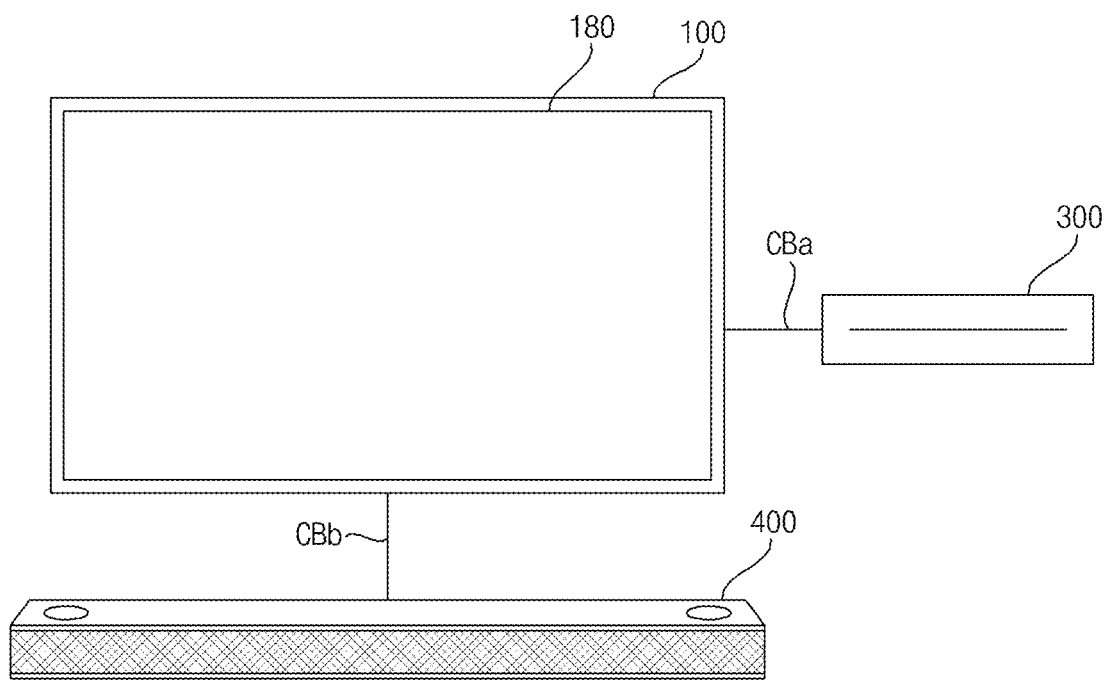
FIG. 1 is a diagram showing an image display system according to one embodiment of the present disclosure.

FIG. 1 is a diagram showing an image display system according to one embodiment of the present disclosure.

Referring to the figure, an image display system 10 according to one embodiment of the present disclosure comprises an image display apparatus 100 equipped with a display 180 and an external device 300 or 400.

Meanwhile, the first external device 300 may be a set-top box for receiving a broadcast signal or a game device.

Meanwhile, the second external device 300 or 400 may be a sound output device.

The image display apparatus 100 may be connected to the external device 300 or 400 through a wired cable CBa or CBb and exchange data through the interface.

Meanwhile, in case in which connected to the external device 300 or 400 or changing the image output mode, the image display apparatus 100 according to one embodiment of the present disclosure transmits a plurality of display identification data to the external device 300 or 400, decodes image data received from the external device 300 or 400 using a plurality of decoders, select one from among a plurality of decoded image data, and output the selected decoded image data to the display 180.

Accordingly, an image may be stably displayed based on the image data received from the external device 300 or 400. Furthermore, since a plurality of display identification data are transmitted, display identification data corresponding to image data transmitted from the external device 300 or 400 may be transmitted.

Meanwhile, the display 180 may be implemented using one of various panels. For example, the display 180 may be implemented using one of a liquid crystal display (LCD) panel, an organic light-emitting panel (OLED panel), or an inorganic light-emitting panel (LED panel).

Meanwhile, the image display apparatus 100 of FIG. 1 may be a TV, a monitor, a tablet PC, or a mobile terminal.

Figure 2:
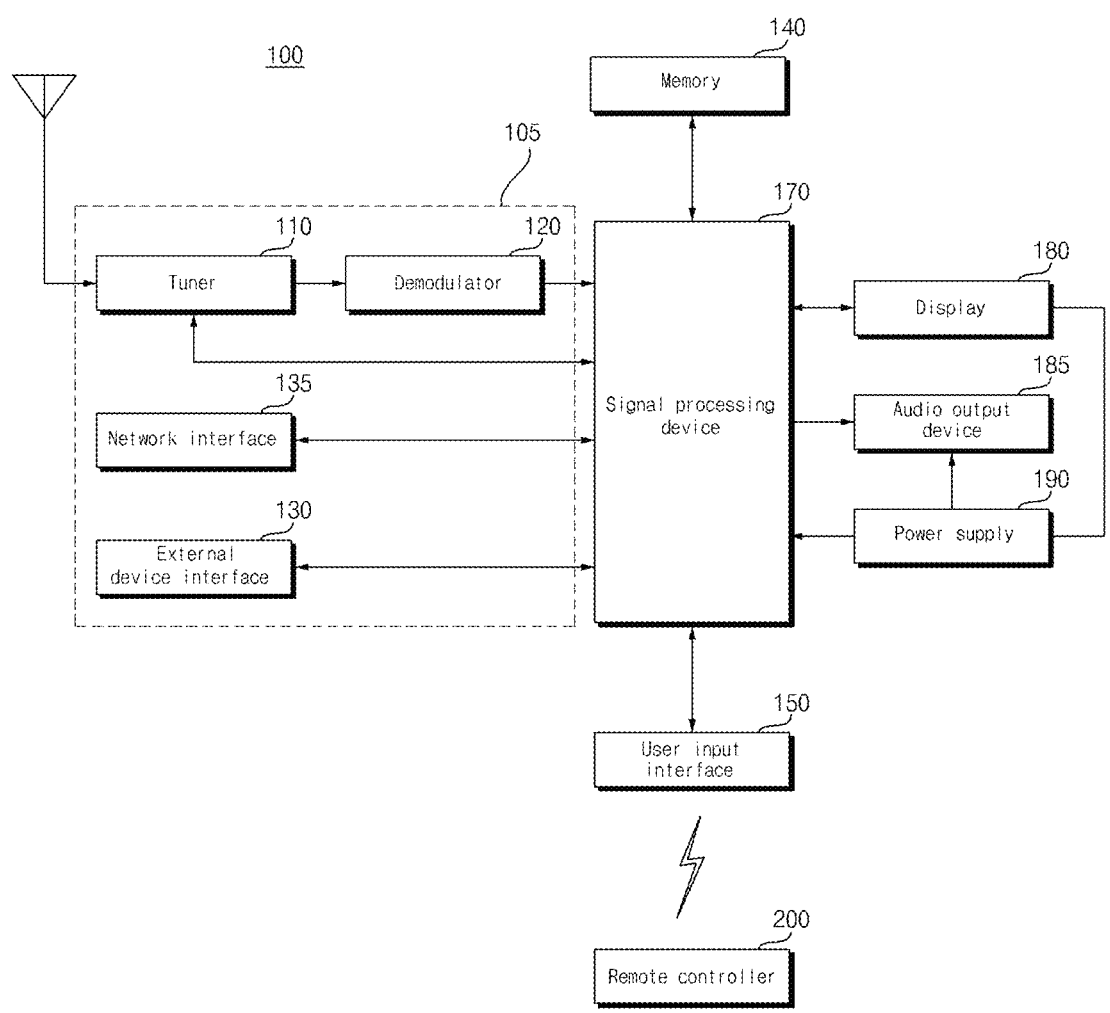
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to one embodiment of the present disclosure may include an image receiver 105, an external device interface 130, a memory 140, a user input interface 150, a sensor device (1220 of FIG. 12), a signal processing device 170, a display 180, and an audio output device 185.

The image receiver 105 may include a tuner 110, a demodulator 120, a network interface 135, and an external apparatus interface 130.

Meanwhile, unlike the figure, the image receiver 105 may include only the tuner 110, the demodulator 120, and the external device interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, the tuner 110 converts the digital broadcast signal into a digital IF (DIF) signal and, if the selected RF broadcast signal is an analog broadcast signal, the tuner 110 converts the analog broadcast signal into an analog baseband image or voice (CVBS/SIF) signal. That is, the tuner 110 may process a digital broadcast signal or an analog broadcast signal. The analog baseband image or voice (CVBS/SIF) signal output from the tuner 110 may be directly input to the signal processing device 170.

Meanwhile, the tuner 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processing device 170. The signal processing device 170 performs demultiplexing, image or audio signal processing, and the like, and then outputs an image to the display 180 and outputs audio to the audio output device 185.

The external device interface 130 may transmit or receive data with a connected external apparatus (not shown), e.g., a set-top box 50. To this end, the external device interface 130 may include an A/V input and output device (not shown).

The external device interface 130 may be connected in wired or wirelessly to an external apparatus, such as a digital versatile disk (DVD), a Blu ray, a game equipment, a camera, a camcorder, a computer (notebook), and a set-top box, and may perform an input or output operation with an external apparatus.

The A/V input and output device may receive image and audio signals from an external apparatus. Meanwhile, a wireless transceiver (not shown) may perform short-range wireless communication with other electronic apparatus.

Through the wireless transceiver (not shown), the external device interface 130 may exchange data with an adjacent mobile terminal 600. In particular, in a mirroring mode, the external device interface 130 may receive device information, executed application information, application image, and the like from the mobile terminal 600.

The network interface 135 provides an interface for connecting the image display apparatus 100 to a wired or wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processing device 170, and may store signal-processed image, audio, or data signal.

In addition, the memory 140 may serve to temporarily store image, audio, or data signal input to the external device interface 130. In addition, the memory 140 may store information on a certain broadcast channel through a channel memory function, such as a channel map.

Although FIG. 2 illustrates that the memory is provided separately from the signal processing device 170, the scope of the present disclosure is not limited thereto. The memory 140 may be included in the signal processing device 170.

The user input interface 150 transmits a signal input by the user to the signal processing device 170 or transmits a signal from the signal processing device 170 to the user.

For example, the user input interface 150 may transmit or receive a user input signal, such as power on/off, channel selection, screen setting, and the like from a remote controller 200; may send a user input signal input from a local key (not shown), such as a power key, a channel key, a volume key, a set value, and the like to the signal processing device 170; may send a user input signal input from a sensor device (not shown) that senses a user's gesture to the signal processing device 170; or may transmit a signal from the signal processing device 170 to the sensor device (1220 of FIG. 12).

The signal processing device 170 may demultiplex the input stream through the tuner 110, the demodulator 120, the network interface 135, or the external device interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a processed image signal.

The image signal processed by the signal processing device 170 is input to the display 180, and may be displayed as an image corresponding to the image signal. In addition, the image signal processed by the signal processing device 170 may be input to the external device through the external device interface 130.

The audio signal processed by the signal processing device 170 may be output to the audio output device 185 as an audio signal. In addition, audio signal processed by the signal processing device 170 may be input to the external device through the external device interface 130.

Although not shown in FIG. 2, the signal processing device 170 may include a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 may control the overall operation of the image display apparatus 100. For example, the signal processing device 170 may control the tuner 110 to control the tuning of the RF broadcast corresponding to the channel selected by the user or the previously stored channel.

In addition, the signal processing device 170 may control the image display apparatus 100 according to a user command input through the user input interface 150 or an internal program.

Meanwhile, the signal processing device 170 may control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processing device 170, an image signal, a data signal, a control signal, and the like received from the external device interface 130.

Meanwhile, the display 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which may be implemented in the form of a system on chip (SOC), a display 180 for displaying an image, and an audio output device 185 for outputting an audio.

Specifically, the power supply 190 may include a converter converting AC power to DC voltage and a DC/DC converter converting the level of the DC voltage.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150 and display it on the remote controller 200 or output it as an audio.

Meanwhile, the image display apparatus 100 may be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be split into two or more components. The function performed in each block is described for the purpose of illustrating embodiments of the present disclosure, and specific operation and apparatus do not limit the scope of the present disclosure.

Figure 3:
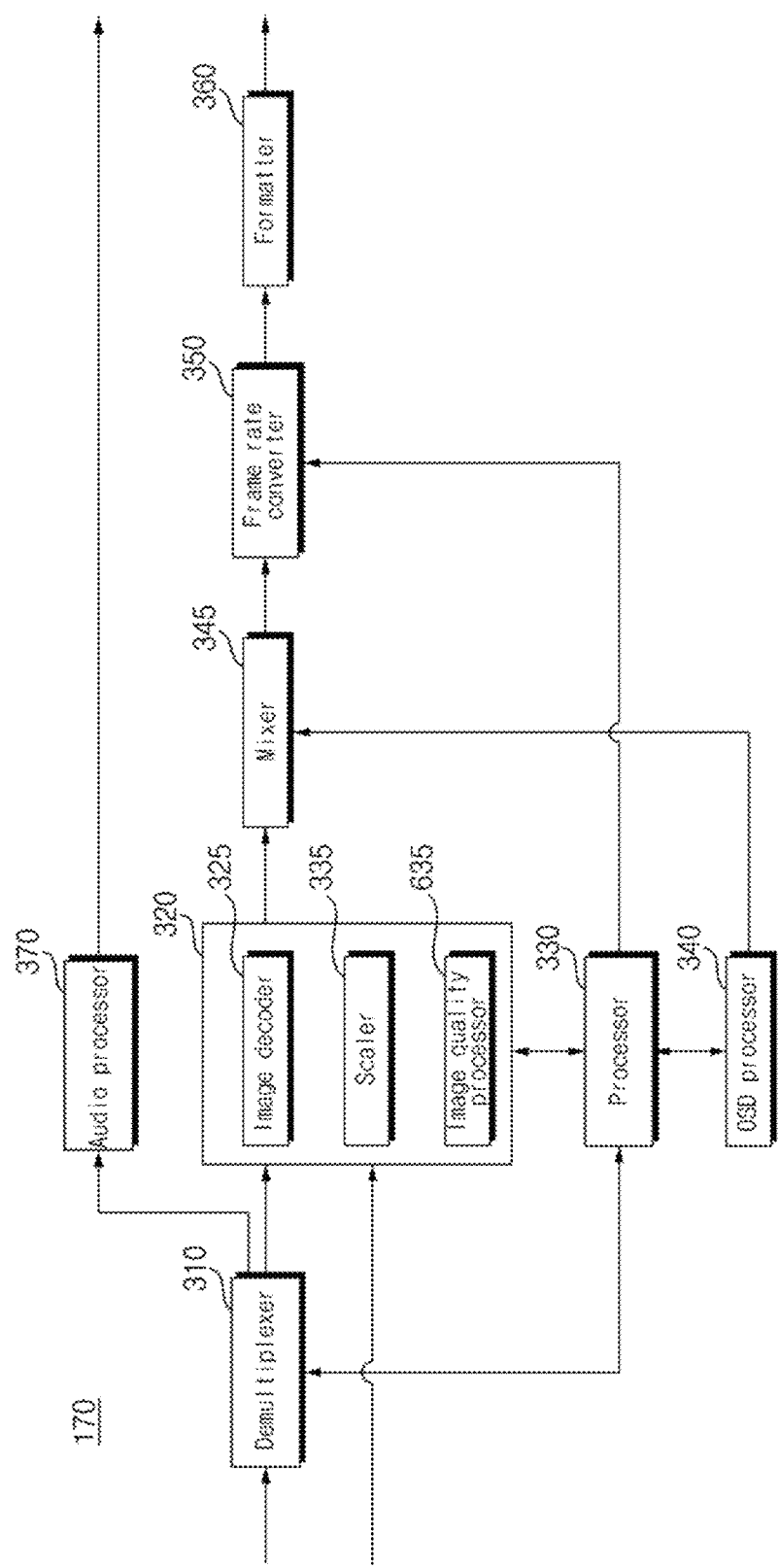
FIG. 3 is an example of an internal block diagram of a signal processing device of FIG. 2.

FIG. 3 is an example of an internal block diagram of the signal processing device in FIG. 2.

Referring to the figure, the signal processing device 170 according to an embodiment of the present disclosure may include a demultiplexer 310, an image processor 320, a processor 330, and an audio processor 370. In addition, the signal processing device 170 may further include and a data processor (not shown).

The demultiplexer 310 demultiplexes the input stream. For example, in case in which an MPEG-2 TS is input, it may be demultiplexed into image, audio, and data signal, respectively. Here, the stream signal input to the demultiplexer 310 may be a stream signal output from the tuner 110, the demodulator 120, or the external device interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal may be output from the display 180.

The image decoder 325 may include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 635 may perform noise reduction processing on an input image signal, extend the gray scale resolution of an input image signal, perform image resolution enhancement, perform high dynamic range (HDR)-based signal processing, change a frame rate, or perform image quality processing relevant to the panel characteristics.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data, such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processing device, and the OSD processor 340 may include such a pointing signal processing device (not shown). Obviously, the pointing signal processing device (not shown) may be provided separately from the OSD processor 340.

The frame rate converter (FRC) 350 may convert a frame rate of an input image. Meanwhile, the frame rate converter 350 may output the input image without converting the frame rate.

Meanwhile, the formatter 360 may change a format of an input image signal into a format suitable for displaying the image signal on a display and output the image signal in the changed format.

In particular, the formatter 360 may change a format of an image signal to correspond to a display panel.

Further, the formatter 360 may convert the format of an image signal. For example, the formatter 360 may convert the format of a 3D image signal into one of various 3D formats, including a side-by-side format, a top/down format, a frame sequential format, an interlaced format, a checker box format, etc.

The processor 330 may control overall operations of the image display apparatus 100 or the signal processing device 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external device interface 130.

In addition, the processor 330 may control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may include various decoders.

In addition, the audio processor 370 in the signal processing device 170 may process a base, a treble, a volume control, and the like.

The data processor (not shown) in the signal processing device 170 may perform data processing of the demultiplexed data signal. For example, in case in which the demultiplexed data signal is a coded data signal, it may be decoded. The encoded data signal may be electronic program guide information including broadcast information, such as a start time and an end time of a broadcast program broadcasted on each channel.

Meanwhile, a block diagram of the signal processing device 170 shown in FIG. 3 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the image processor 320.

Figure 4A:
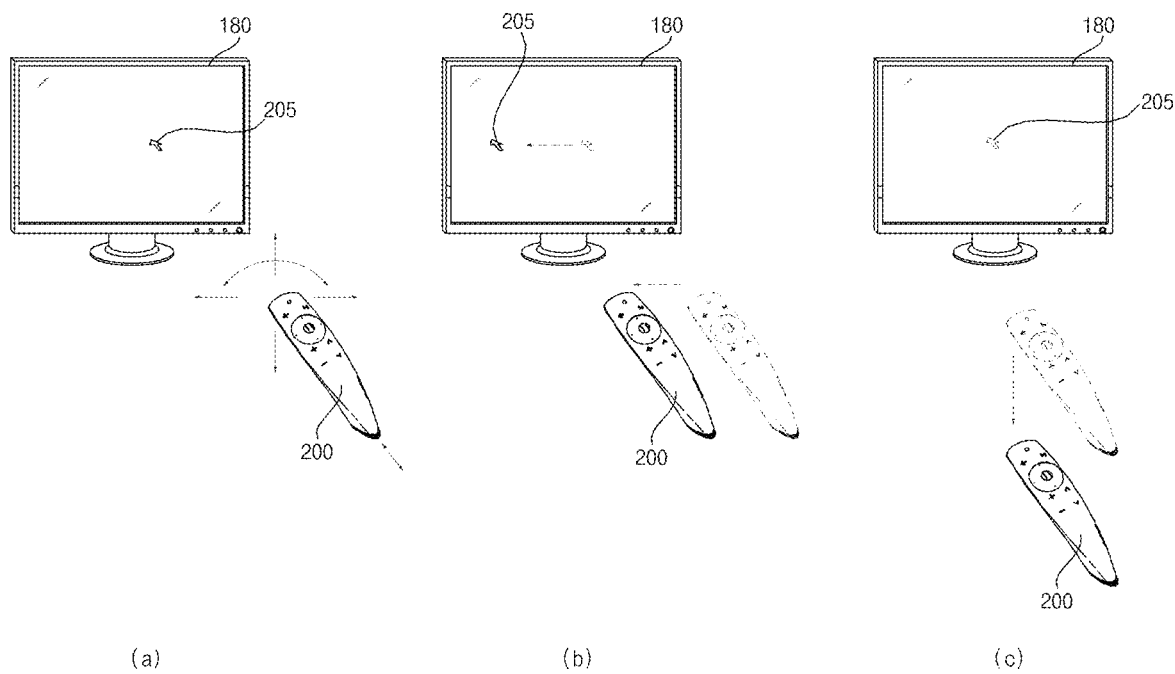
FIG. 4A is a diagram showing a method of controlling a remote controller of FIG. 2.

FIG. 4A is a diagram illustrating a control method of a remote controller of FIG. 2.

As shown in FIG. 4A (a), it is illustrated that a pointer 205 corresponding to the remote controller 200 is displayed on the display 180.

The user may move or rotate the remote controller 200 up and down, left and right (FIG. 4A (b)), and back and forth (FIG. 4A (c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the figure.

FIG. 4A (b) illustrates that in case in which the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A (c) illustrates a case where the user moves the remote controller 200 away from the display 180, while pressing a specific button of the remote controller 200. Thus, a selection area within the display 180 corresponding to the pointer 205 may be zoomed in so that it may be displayed to be enlarged. Meanwhile, in case in which the user moves the remote controller 200 close to the display 180, the selection area within the display 180 corresponding to the pointer 205 may be zoomed out so that it may be displayed to be reduced. Meanwhile, in case in which the remote controller 200 moves away from the display 180, the selection area may be zoomed out, and in case in which the remote controller 200 approaches the display 180, the selection area may be zoomed in.

Meanwhile, in case in which the specific button of the remote controller 200 is pressed, it is possible to exclude the recognition of vertical and lateral movement. That is, in case in which the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
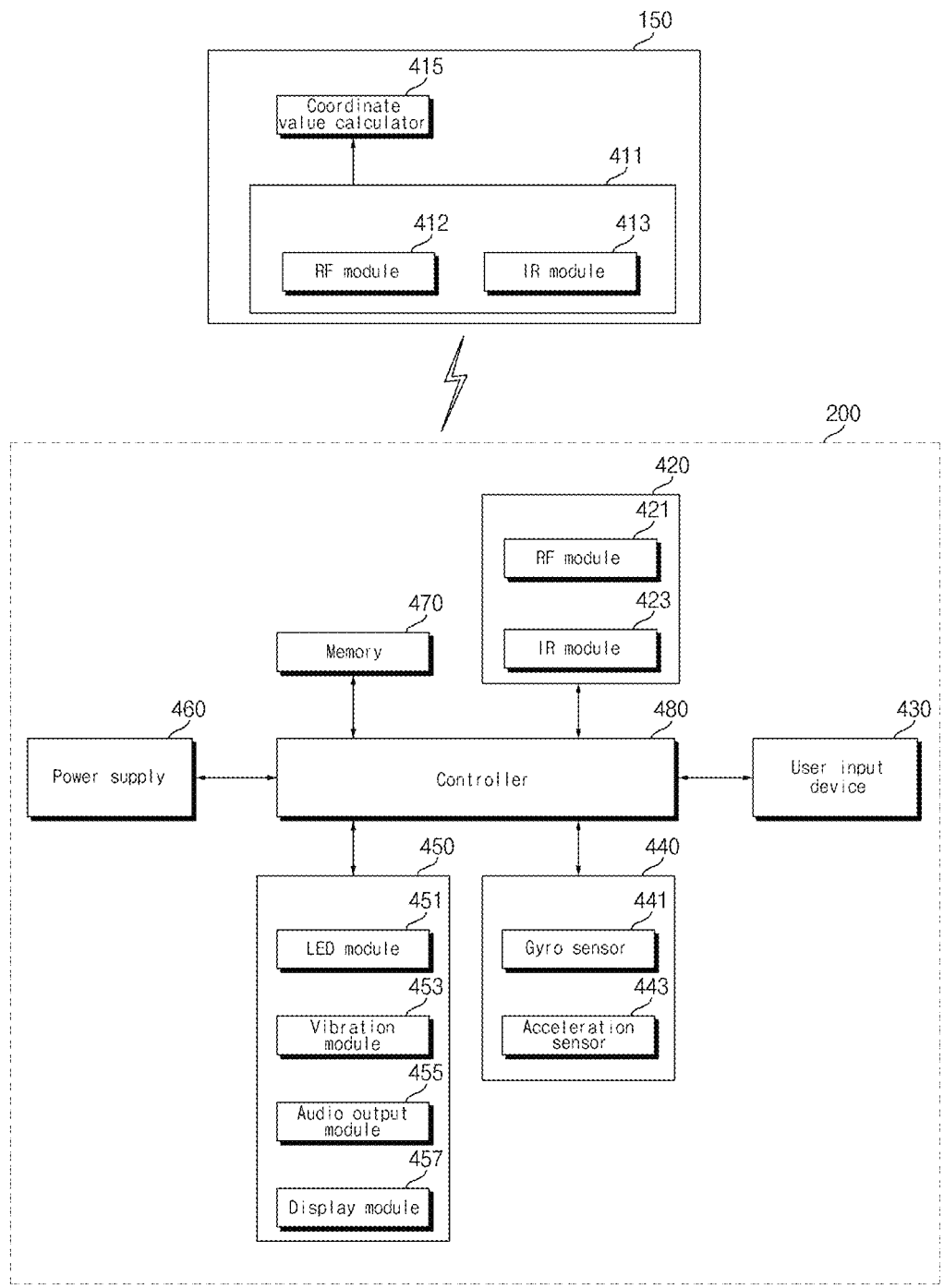
FIG. 4B is an internal block diagram of the remote controller of FIG. 2.

FIG. 4B is an internal block diagram of the remote controller of FIG. 2.

Referring to the figure, the remote controller 200 includes a wireless transceiver 425, a user input device 435, a sensor device 440, an output device 450, a power supply 460, a memory 470, and a controller 480.

The wireless transceiver 425 transmits or receives a signal to or from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on or off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user may input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means, such as a scroll key, a jog key, etc., which may be operated by the user, and the present disclosure does not limit the scope of the present disclosure.

The sensor device 440 may include a gyro sensor 441 or an acceleration sensor 443. The gyro sensor 441 may sense information regarding the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on in case in which the user input device 435 is operated or a signal is transmitted or received to or from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply in case in which a certain key provided in the remote controller 200 is operated.

The memory 470 may store various types of programs, application data, and the like necessary for the control or operation of the remote controller 200. If the remote controller 200 wirelessly transmits and receives a signal to or from the image display apparatus 100 through the RF module 421, the remote controller 200 and the image display apparatus 100 transmit and receive a signal through a certain frequency band. The controller 480 of the remote controller 200 may store information regarding a frequency band or the like for wirelessly transmitting and receiving a signal to or from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of handshake or error.

For another example, unlike the figure, the coordinate value calculator 415 may be provided in the signal processing device 170, not in the user input interface 150.

Figure 5:
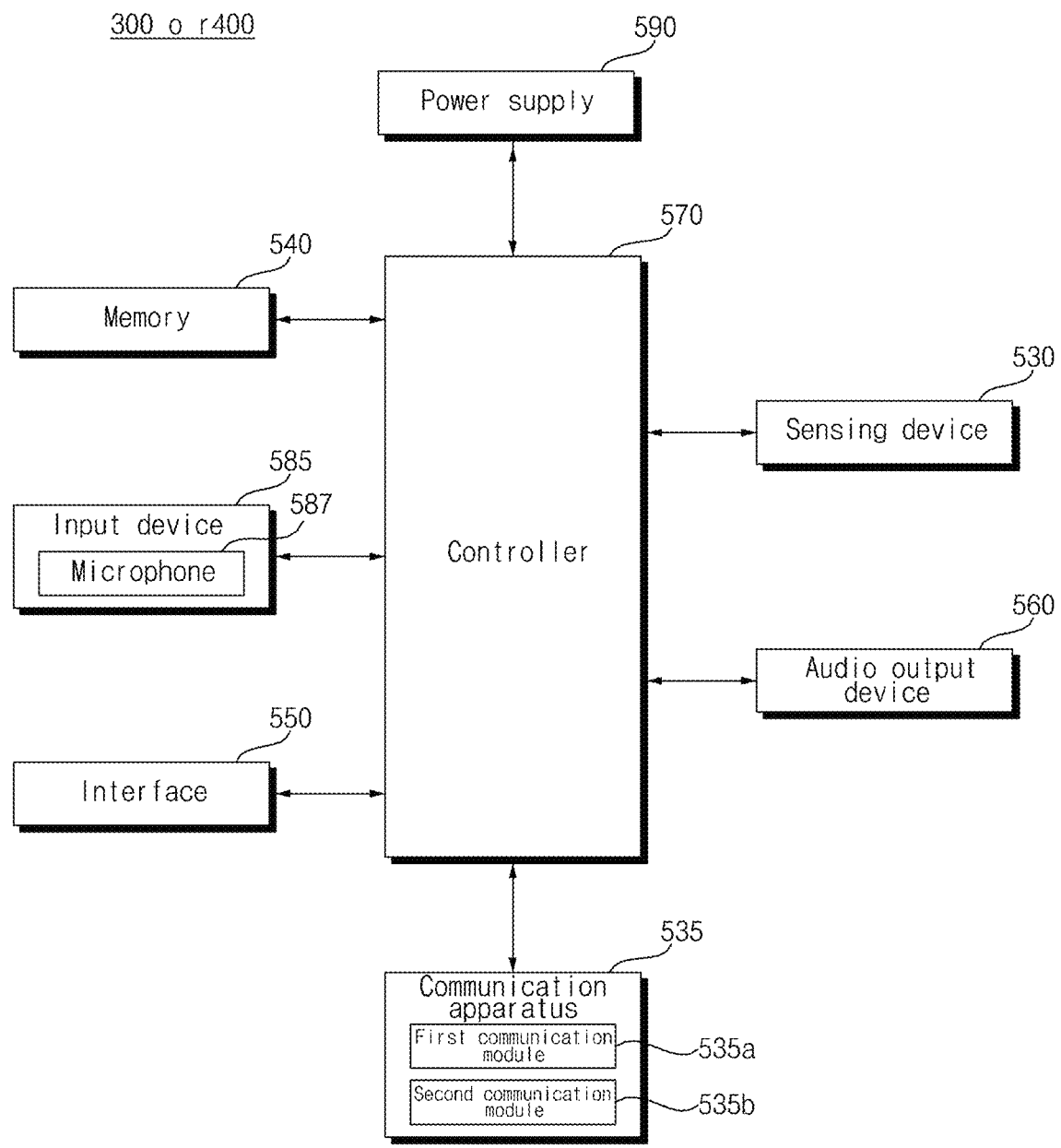
FIG. 5 is an example of an internal block diagram of the external device of FIG. 1.

FIG. 5 is an example of an internal block diagram of the external device of FIG. 1.

Referring to the figure, the external device 300 or 400 may include a sensing device 530, a communication apparatus 535, a memory 540, an interface 550, an audio output device 560, a controller 570, an input device 585, and a power supply 590. When these constituting elements are implemented in practical applications, two or more constituting elements may be combined into one constituting element, or one constituting element may be subdivided into two or more constituting elements as needed.

The sensing device 530 may include an inertial sensor (not shown). The inertial sensor may be composed of an acceleration sensor, a gyro sensor, and a gravity sensor. For example, the acceleration sensor, gyro sensor, and gravity sensor may constitute a 6-axis sensor.

The sensing device 530 may output the motion information of the external device 300 or 400, for example, motion information (acceleration information or angular velocity information) or position information with reference to the x, y, and z axis.

Meanwhile, the sensing device 530 may sense the temperature information, current information, or voltage information of the external device 300 or 400.

Meanwhile, the communication apparatus 535 may provide an interface for communication with the image display apparatus 100. To this end, the communication apparatus 535 may include a first communication module 535a and a second communication module 535b.

For example, as a wireless communication module, the first communication module 535a within the communication apparatus 535 may provide an interface for wireless data communication such as Bluetooth.

For example, as a wireless communication module, the second communication module 535b within the communication apparatus 535 may provide an interface for wireless data communication such as WiFi or UWB.

The memory 540 may store a program for processing or controlling of the controller 570 within the external device 300 or 400 and may perform a function for temporarily storing input or output data.

The interface 550 may provide an interface for wired data communication, such as HDMI.

For example, the interface 550 may transmit video or audio data to the image display apparatus 100.

The audio output device 560 may output a sound based on the audio signal processed in the controller 570 within the external device 300 or 400.

The controller 570 may control the overall operation of the external device 300 or 400 by controlling the operation of each unit within the external device 300 or 400.

Meanwhile, the controller 570 may perform signal processing on the audio signal received from the outside.

Meanwhile, the controller 570 may play the audio signal received from the first communication module 535a or second communication module 535b.

Meanwhile, the input device 585 may include a button for initializing the external device 300 or 400 or motion input.

Meanwhile, the input device 585 may include a microphone 587 for collecting sounds.

Meanwhile, the input device 585 may include a camera (not shown) for photographing an image.

The power supply 590 may supply the power required for the operation of each constituting element under the control of the controller 570.

In particular, the power supply 590 may include a battery (not shown) storing and supplying DC power.

Figure 6:
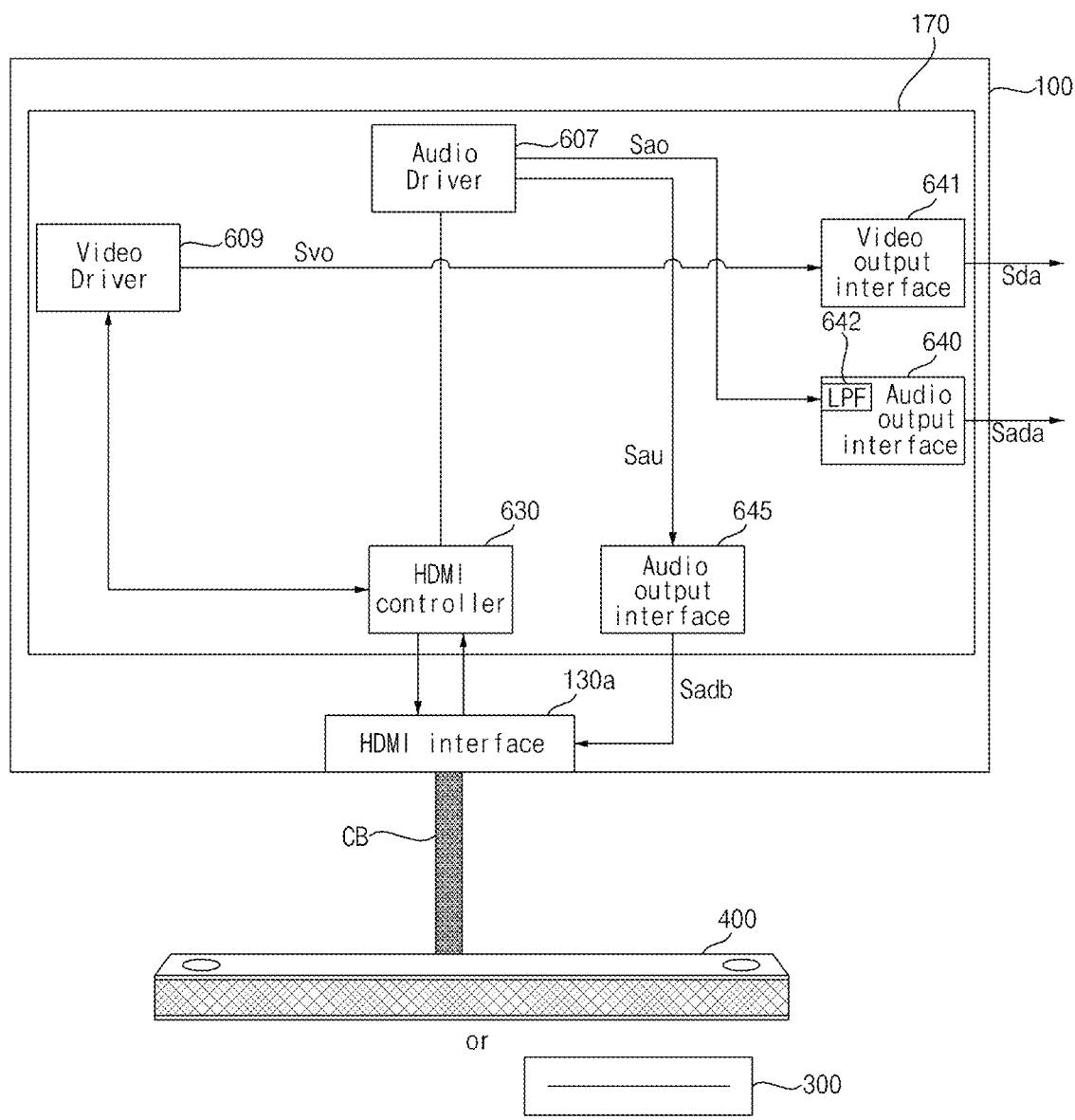
FIG. 6 is an example of an internal block diagram of an image display apparatus due to connection to an external device.

FIG. 6 is an example of an internal block diagram of an image display apparatus due to connection to an external device.

Referring to the figure, an image display apparatus 100 according to an embodiment of the present disclosure includes an interface 130a exchanging data with an external device 300 or 400 connected via a wired cable CB and a signal processing device 170.

The interface 130a may be an HDMI interface.

Meanwhile, the signal processing device 170 may transmit display identification data stored in the memory 140 to the external device 300 or 400 through the interface 130a.

The external device 300 or 400 may transmit image data or audio data based on the received display identification data.

Meanwhile, the interface 130a may receive image data or audio data from the external device 300 or 400.

Meanwhile, the signal processing device 170 may include an interface controller 630 for controlling the interface 130a, a video driver 609 for image processing, an audio driver 607 for audio processing, and a display output interface 641 for outputting a video to the display 180, a first audio output interface 640 for outputting an audio signal to the audio output device 185, and a second audio output interface 645 for outputting an audio signal to the external device 300 or 400.

The video driver 609 and the audio driver 607 may correspond to the image processor 320 and the audio processor 370 of FIG. 3, respectively.

The video driver 609 may use a decoder to decode image data from the external device 300 or 400 and output decoded image data Svo.

The video output interface 641 may receive decoded image data Svo from the video driver 609 and output image data Sda to the display 180.

The audio driver 607 may use a decoder to decode audio data from the external device 300 or 400 and output decoded audio data Sao, Sau.

The first audio output interface 640 may receive decoded audio data Sao from the audio driver 607 and output audio data Sada to the audio output device 185.

The second audio output interface 645 may receive decoded audio data Sau from the audio driver 607 and output audio data Sadb to the external device 300 or 400.

Figure 7:
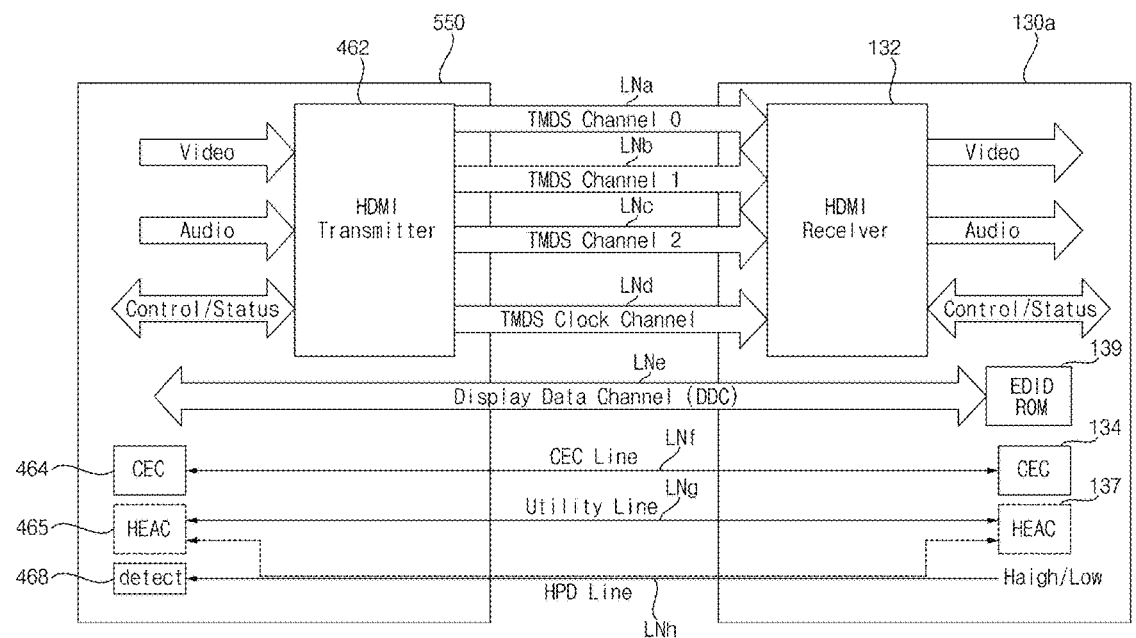
FIG. 7 is a diagram referred to in the description of FIG. 6.

FIG. 7 is a diagram referred to in the description of FIG. 6.

First, FIG. 7 illustrates an example of an interface between the image display apparatus and the external device.

Referring to the figure, the image display apparatus 100 and the external device 300 or 400 employ a wired interface method, such as HDMI, for communication.

The HDMI receiver 132 in the figure may be installed inside the interface 130a of the image display apparatus 100, and the HDMI transmitter 462 may be installed inside the interface 550 of the external device 300 or 400.

Between the HDMI receiver 132 and the HDMI transmitter 462, a plurality of Transition Minimized Differential Signaling (TMDS) lines (LNa-LNd), display data channel lines LNe, CEC lines LNf, utility lines LNg, and HPD lines LNh may be disposed.

Meanwhile, the interface 130a of the image display apparatus 100 may receive the source voltage in case in which the external device 300 or 400 is connected or after the power is turned on. At this time, the source voltage is a DC voltage and may be approximately 5V.

Meanwhile, the interface 130a of the image display apparatus 100 may transmit a hot plug detect (HPD) signal through the HPD line LNh after receiving the source voltage.

In response to the transmission, the detector 468 within the interface 550 of the external device 300 or 400 may receive the hot plug detection (HPD) signal.

Meanwhile, the interface 130a of the image display apparatus 100 may transmit the display identification data stored in the memory 139 through the display data transmission channel line (LNe) after transmitting the hot plug detection (HPD) signal.

At this time, the display identification data may include extended display identification data (EDID).

For example, the display identification data may include manufacturer information, manufacturing date information, product type information, version information, resolution information, color coordinate information, phosphor information, filter information, display size information, luminance information, and pixel information.

Meanwhile, the version information may include the version information of HDMI.

For example, the version information may include HDMI 1.4 version information, HDMI 2.1 version information, and variable refresh rate (VRR) information.

Meanwhile, after receiving the display identification data, the interface 550 of the external device 300 or 400 may transmit image or audio data through a plurality of TMDS lines LNa-LNd in response to the display identification data.

In response to the transmission, the interface 130a of the image display apparatus 100 may receive image or audio data through a plurality of TMDS lines LNa-LNd.

Meanwhile, the interface 130a of the image display apparatus 100 or the interface 550 of the external device 300 or 400 may transmit or receive control information through the CEC line LNf or utility line LNg.

Figure 8A:
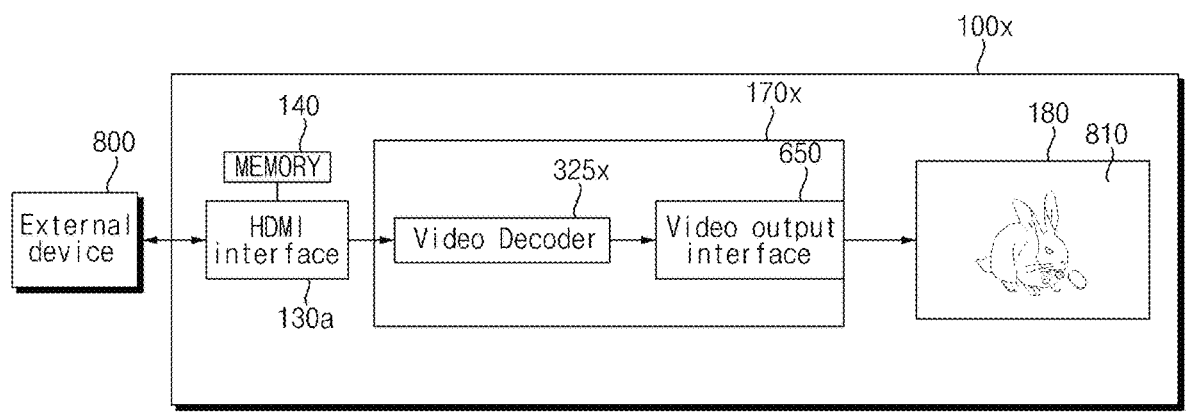
FIGS. 8A to 8B are diagrams illustrating the operation of an image display apparatus related to the present disclosure.
Figure 8B:
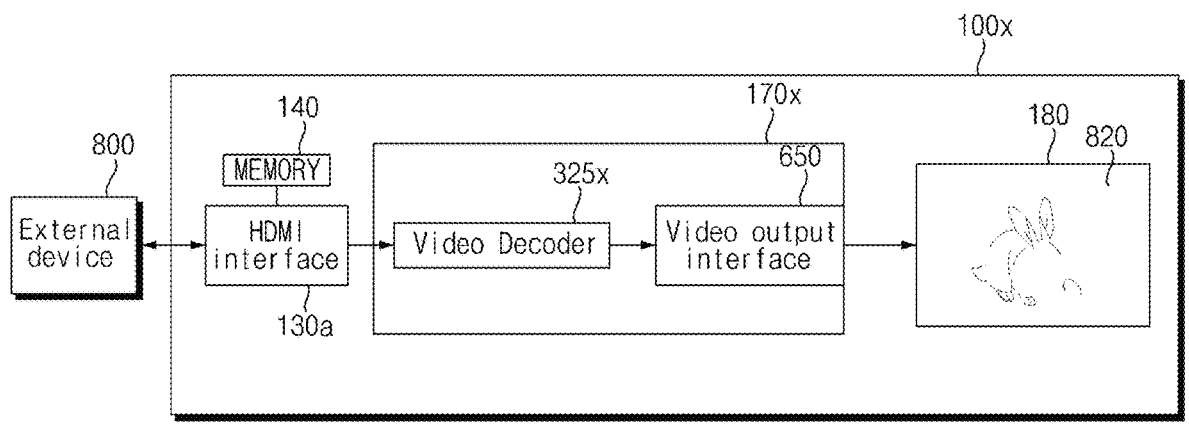

FIGS. 8A to 8B are diagrams illustrating the operation of an image display apparatus related to the present disclosure.

FIG. 8A illustrates an example of operation of an image display apparatus related to the present disclosure.

Referring to the figure, the interface 130*a* of the image display apparatus 100*x* related to the present disclosure may transmit display identification data stored in the memory 140 to the external device 800 in case in which being connected to the external device 800.

At this time, the display identification data may include the HDMI version 2.1 information.

The external device 800 receives display identification data based on the HDMI version 2.1 information.

At this time, in case in which the external device 800 is an apparatus capable of transmitting image data based on the HDMI version 2.1, the external device 800 transmits image data based on the HDMI version 2.1 to the image display apparatus 100*x*.

The interface 130*a* of the image display apparatus 100*x* receives the image data based on the HDMI version 2.1 and transmits the received image data to the signal processing device 170*x*.

The video decoder 325*x* within the signal processing device 170*x* of the image display apparatus 100*x* performs decoding and transmits the decoded image data to the video output interface 650.

The display 180 displays an image 810 corresponding to the image data received through the video output interface 650.

FIG. 8B illustrates an example of operation of an image display apparatus related to the present disclosure.

Referring to the figure, the interface 130*a* of the image display apparatus 100*x* related to the present disclosure may transmit display identification data stored in the memory 140 to the external device 800 in case in which being connected to the external device 800.

At this time, the display identification data may include the HDMI version 2.1 information.

The external device 800 receives display identification data based on the HDMI version 2.1 information.

At this time, in case in which the external device 800 is an apparatus incapable of transmitting image data based on the HDMI version 2.1 but an apparatus capable of transmitting image data based on the HDMI version 1.4, the external device 800 transmits image data based on the HDMI version 1.4 to the image display apparatus 100*x*.

The interface 130*a* of the image display apparatus 100*x* receives the image data based on the HDMI version 1.4 and transmits the received image data to the signal processing device 170*x*.

The video decoder 325*x* within the signal processing device 170*x* of the image display apparatus 100*x* performs decoding and transmits the decoded image data to the video output interface 650.

The display 180 displays an image 820 corresponding to the image data received through the video output interface 650.

At this time, since the HDMI version information does not match between the image display apparatus 100*x* and the external device 800, at least a portion of the image 820 displayed on the display 180 may be damaged.

Figure 9A:
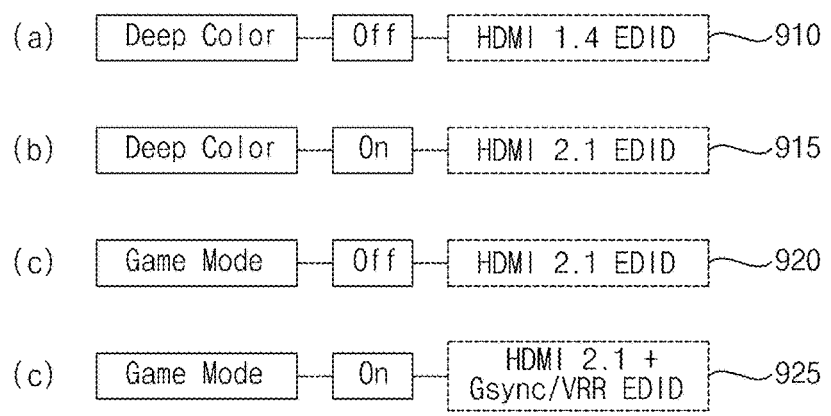
FIG. 9A is a diagram showing various display identification data.

FIG. 9A is a diagram showing various display identification data.

Referring to the figure, in case in which the deep color mode of the image display apparatus 100 is turned off, the image display apparatus 100 may transmit display identification data 910 based on the HDMI version 1.4 to the external device 800.

Meanwhile, in case in which the deep color mode of the image display apparatus 100 is turned on, the image display apparatus 100 may transmit display identification data 915 based on the HDMI version 2.1 to the external device 800.

Meanwhile, in case in which the game mode of the image display apparatus 100 is turned off, the image display apparatus 100 may transmit display identification data 920 based on the HDMI version 2.1 to the external device 800.

Meanwhile, in case in which the game mode of the image display apparatus 100 is turned on, the image display apparatus 100 may transmit display identification data 935 based on the HDMI version 2.1+VRR to the external device 800.

In the figure, the display identification data 910 based on the HDMI version 1.4 may be referred to as first display identification data; the display identification data 915 based on the HDMI version 2.1 or display identification data 920 based on the HDMI version 2.1 may be referred to as second display identification data; and the display identification data 935 based on the HDMI version 2.1+VRR may be referred to as third display identification data.

Figure 9B:
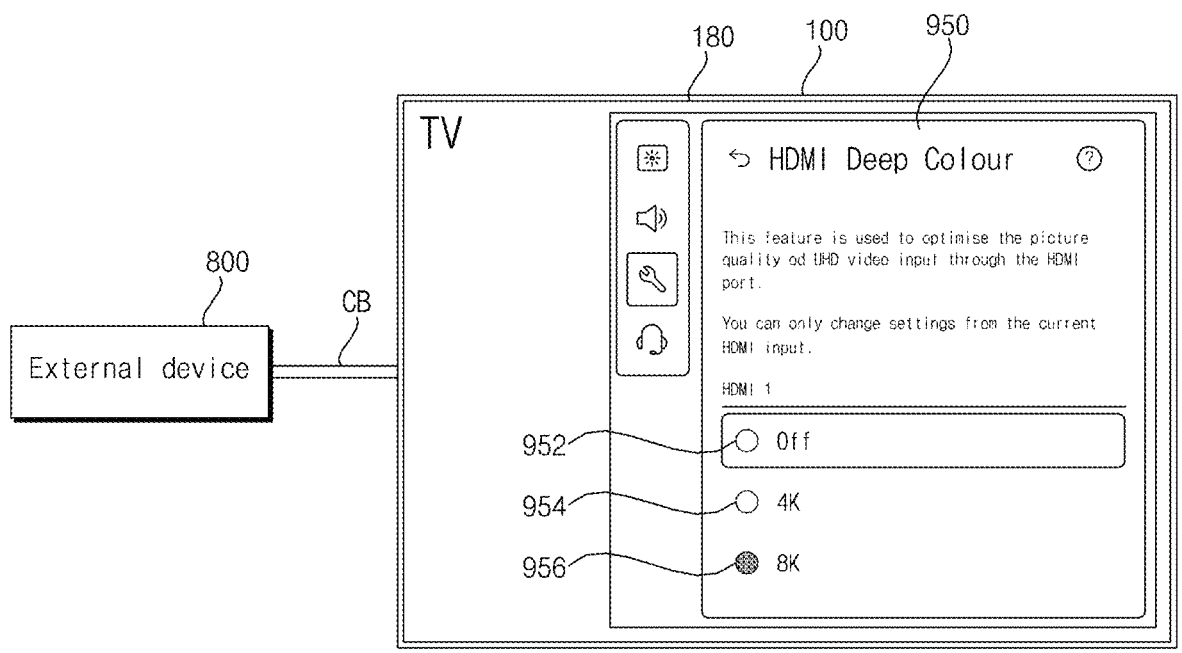
FIGS. 9B to 9C are diagrams referred to in the description of FIG. 9A.
Figure 9C:
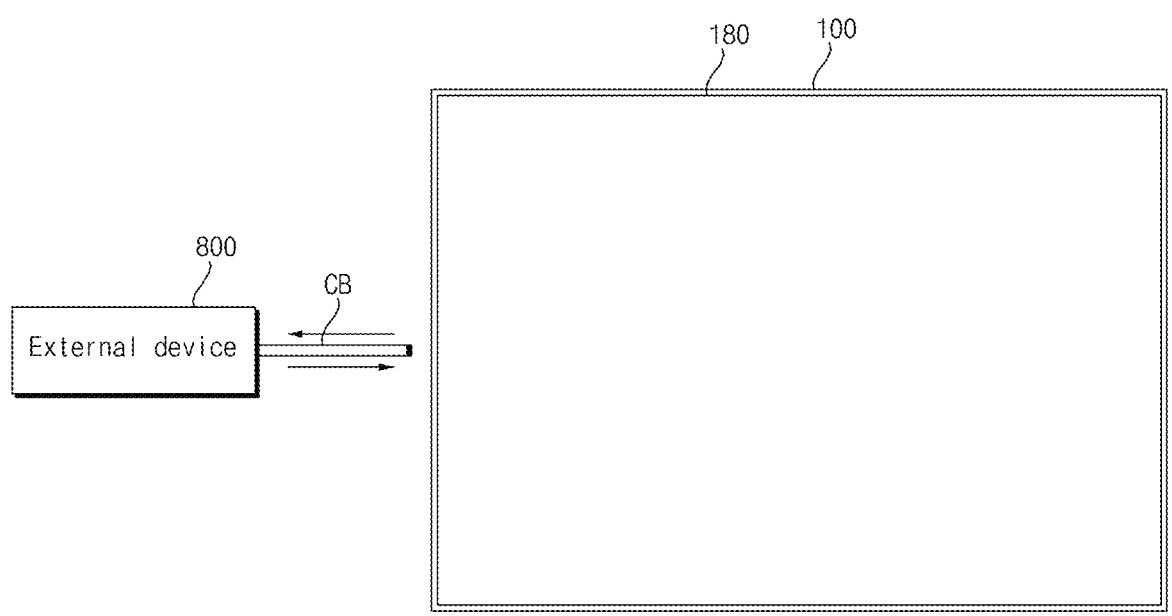

FIGS. 9B to 9C are diagrams referred to in the description of FIG. 9A.

FIG. 9B illustrates a case in which the deep color mode of the image display apparatus is turned on.

Referring to the figure, while the deep color mode of the image display apparatus 100 is turned on, the external device 800 may receive display identification data through a cable CB.

At this time, as shown in FIG. 9A (c), the display identification data may correspond to the display identification data 915 based on the HDMI version 2.1.

Meanwhile, in case in which the external apparatus 800 does not properly parse the display identification data 920 based on the HDMI version 2.1 and transmits image data based on the HDMI version 1.4 to the image display apparatus 100, a partially damaged image 820 may be displayed on the display 180, as shown in FIG. 8B.

As a first solution to the case above, since display identification data transmitted to the external device 800 needs to be changed, the signal processing device 170 of the image display apparatus 100 may control a settings screen 950 to be displayed on the display 180.

The settings screen 950 may include a deep color off item 952, a first resolution item 954, and a second resolution item 956.

Meanwhile, in case in which the deep color item 952 is selected from the settings screen 950, the image display apparatus 100 may transmit the display identification data 910 based on the HDMI version 1.4, as shown in FIG. 9A (a), to the external device 800.

Then, the external device 800 may parse the display identification data 910 based on the HDMI version 1.4 and transmit image data based on the HDMI version 1.4 to the image display apparatus 100. Accordingly, as shown in FIG. 8A, an undamaged image 810 may be displayed on the display 180.

FIG. 9C illustrates a case in which a cable is detached and reconnected between the image display apparatus and the external apparatus.

Referring to the figure, in case in which the external apparatus 800 does not properly parse the display identification data 920 based on the HDMI version 2.1 and transmits image data based on the HDMI version 1.4 to the image display apparatus 100, a partially damaged image 820 may be displayed on the display 180, as shown in FIG. 8B.

As a second solution to the case above, in case in which a cable CB is detached and reconnected between the image display apparatus 100 and the external apparatus 800, the display identification data 910 based on the HDMI version 1.4, as shown in FIG. 9A (a), may be transmitted to the external device 800.

Then, the external device 800 may parse the display identification data 910 based on the HDMI version 1.4 and transmit image data based on the HDMI version 1.4 to the image display apparatus 100. Accordingly, as shown in FIG. 8A, an undamaged image 810 may be displayed on the display 180.

The method of displaying a settings screen 950 of FIG. 9B is inconvenient since the method involves multiple procedures, and the method of FIG. 9C based on detaching and reconnecting of a cable CB is also inconvenient since it requires a complicated process.

Accordingly, the present disclosure proposes a simple method for reducing an error due to transmission of display identification data.

The signal processing device 170 within the image display apparatus 100 according to an embodiment of the present disclosure is configured to transmit a plurality of display identification data to an external device 800 at the time of connecting to the external device 800 or changing the image output mode, decode image data received from the external device 800 using a plurality of decoders, select one from among a plurality of decoded image data, and output the selected decoded image data to the display 180.

Accordingly, an image may be stably displayed based on image data received from the external device 800. Furthermore, since a plurality of display identification data are transmitted, display identification data corresponding to image data transmitted from the external device 800 may be transmitted.

Meanwhile, the operation of the image display apparatus 100 according to an embodiment of the present disclosure will be described in more detail with reference to FIG. 10 and subsequent drawings.

Figure 10:
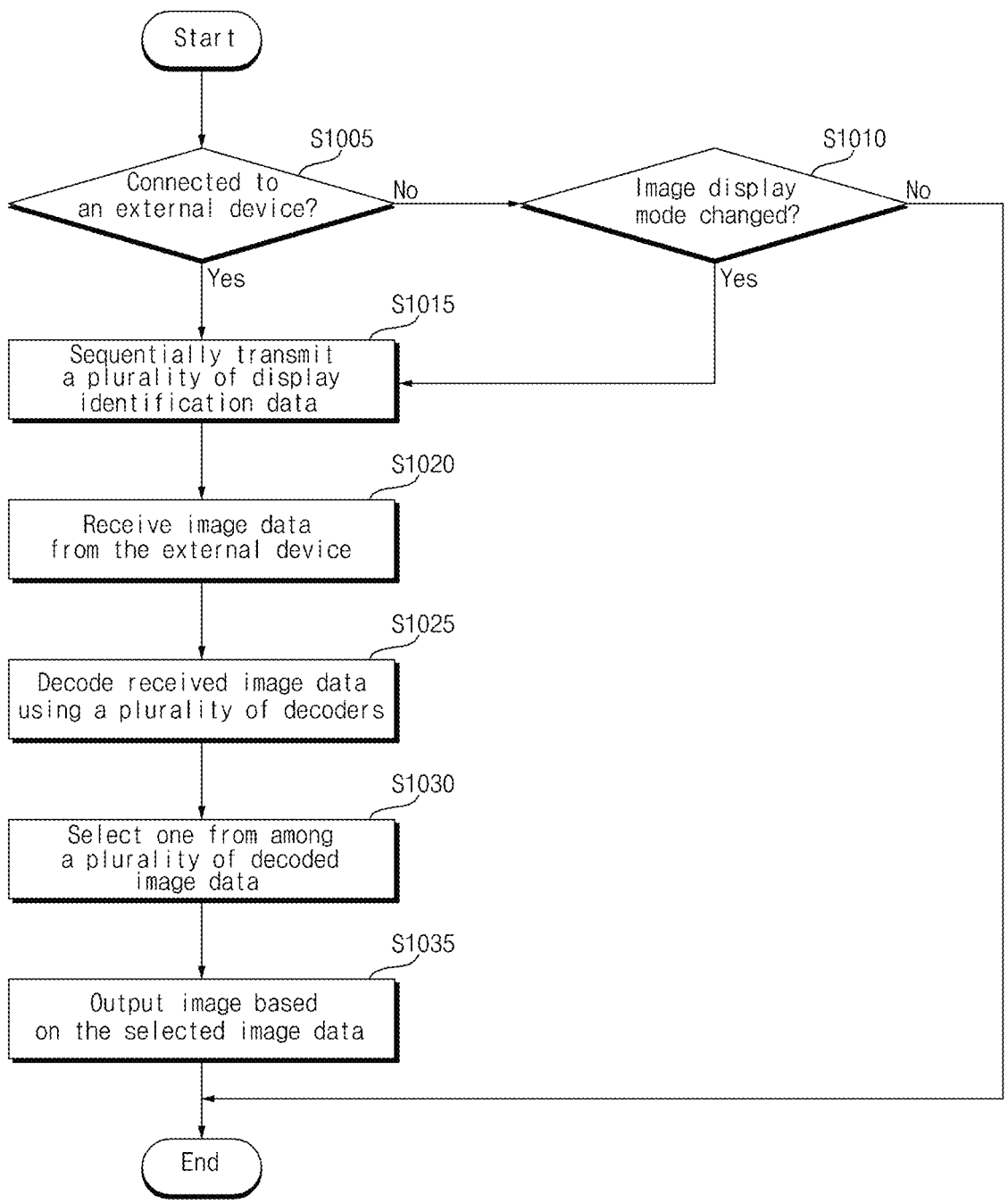
FIG. 10 is a flow diagram illustrating a method for operating an image display apparatus according to one embodiment of the present disclosure.

FIG. 10 is a flow diagram illustrating a method for operating an image display apparatus according to one embodiment of the present disclosure.

Referring to the figure, the image display apparatus 100 according to one embodiment of the present disclosure determines whether it is connected to the external device 800 (S1005) and, if connected, sequentially transmits a plurality of display identification data to the external device 800 (S1015).

For example, in case in which the image display apparatus 100 is connected to the external device 800 and a source voltage is received from the external device 800, the image display apparatus 100 may determine that it is connected to the external device 800.

Meanwhile, in case in which the image display apparatus 100 is connected to the external device 800 and a source voltage is received from the external device 800, the signal processing device 170 within the image display apparatus 100, in case in which connected to the external device 800, is configured to sequentially transmit a plurality of display identification data to the external device 800 through the interface 130a.

Meanwhile, if it is determined that the image display apparatus 100 is not connected to the external device 800 in the S1005 step, the S1010 step may be performed.

For example, in case in which the image display apparatus 100 is already connected to the external device 800 and a source voltage is already received from the external device 800, it may not be determined as the S1005 step, which involves establishing a connection to an external device.

Meanwhile, in case in which the image display apparatus 100 is already connected to the external device 800 and a source voltage is already received from the external device 800, the signal processing device 170 within the image display apparatus 100 may determine whether the image display mode is changed (S1010) and, if changed, may be configured to sequentially transmit a plurality of display identification data to the external device 800.

In the S1015 step, a plurality of sequentially output display identification data may include, for example, display identification data 910 based on the HDMI version 1.4 and display identification data 915 or 920 based on the HDMI version 2.1.

In other words, in the S1015 step, a plurality of sequentially output display identification data may consist of, for example, two display identification data.

Meanwhile, in the S1015 step, a plurality of sequentially output display identification data may include, for example, display identification data 910 based on the HDMI version 1.4, display identification data 915 or 920 based on the HDMI version 2.1, and display identification data 935 based on the HDMI version 2.1+VRR.

In other words, in the S1015 step, a plurality of sequentially output display identification data may consist of, for example, three display identification data.

Next, the interface 130a of the image display apparatus 100 may receive image data from the external device 800 (S1020).

Next, the signal processing device 170 of the image display apparatus 100 may decode the received image data using a plurality of decoders (S1025).

Next, the signal processing device 170 of the image display apparatus 100 may select one of a plurality of decoded image data (S1030).

Then, the signal processing device 170 of the image display apparatus 100 may output image data based on the selected decoded image data to the display 180 (S1035).

Meanwhile, in case in which a plurality of display identification data are sequentially transmitted to the external device 800, the external device 800 may transmit the corresponding image data to the image display apparatus 100 based on one of a plurality of received display identification data.

For example, in case in which the external device 800 transmits image data based on the HDMI version 1.4 to the image display apparatus 100, the signal processing device 170 of the image display apparatus 100 may perform decoding through the first decoder (325a of FIG. 11) based on the HDMI version 1.4, second decoder (325b of FIG. 11) based on the HDMI version 2.1, and third decoder (325c of FIG. 11) based on the HDMI version 2.1+VRR, respectively.

Then, the signal processing device 170 may extract color bit information, resolution information, or image data size information from the image data decoded by a plurality of decoders.

Then, the signal processing device 170 may select one of a plurality of decoded image data based on the color bit information, resolution information, or image data size information.

Meanwhile, in case in which the HDMI version information of the external device 800 matches a decoder within the signal processing device 170, the data size of decoded image data after decoding appears the largest.

Accordingly, the present disclosure determines that the display identification data with the largest data size among a plurality of decoded image data is the one corresponding to the external device 800.

For example, in case in which the external device 800 transmits image data based on the HDMI version 1.4 to the image display apparatus 100, the signal processing device 170 may select and output image data decoded by the first decoder (325a of FIG. 11), which is extracted to have the largest image data size among a plurality of decoded image data.

In another example, in case in which the external device 800 transmits image data based on the HDMI version 2.1 to the image display apparatus 100, the signal processing device 170 may select and output image data decoded by the second decoder (325b of FIG. 11), which is extracted to have the largest image data size among a plurality of decoded image data.

In yet another example, in case in which the external device 800 transmits image data based on the HDMI version 2.1+VRR to the image display apparatus 100, the signal processing device 170 may select and output image data decoded by the third decoder (325c of FIG. 11), which is extracted to have the largest image data size among a plurality of decoded image data.

Accordingly, display identification data corresponding to the external device 800 may be automatically transmitted without involving a separate procedure, such as displaying of the settings screen of FIG. 9B or detaching and reconnecting of the cable CB of FIG. 9C, and consequently, an image may be stably displayed based on the image data received from the external device 800.

Figure 11:
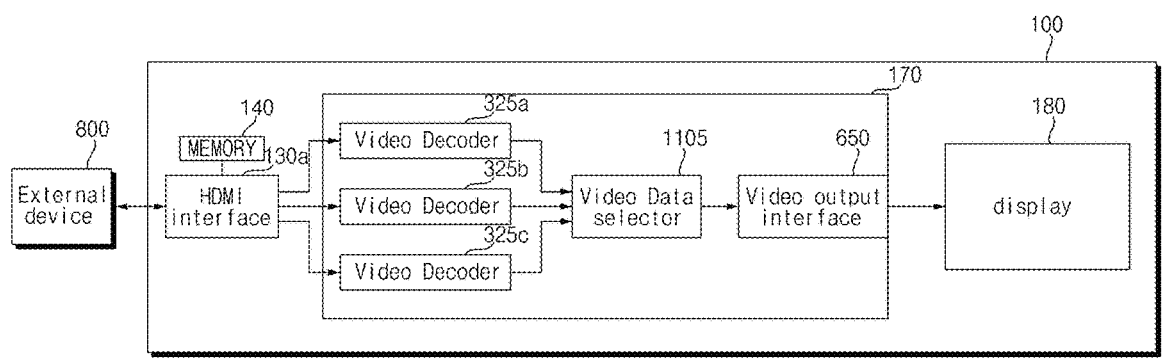
FIG. 11 is an example of an internal block diagram of an image display apparatus according to one embodiment of the present disclosure.

FIG. 11 is an example of an internal block diagram of an image display apparatus according to one embodiment of the present disclosure.

Referring to the figure, the image display apparatus 100 according to one embodiment of the present disclosure comprises a display 180, an interface 130a exchanging data with an external device 800, a memory 140 storing a plurality of display identification data, and a signal processing device 170 controlling to transmit a plurality of display identification data to the external device 800, decoding image data received from the external device 800 using a plurality of decoders, selecting one from among a plurality of decoded image data, and outputting the selected decoded image data to the display 180.

Accordingly, an image may be stably displayed based on image data received from an external device 800. Furthermore, since a plurality of display identification data are transmitted, display identification data corresponding to image data transmitted from the external device 800 may be transmitted.

Meanwhile, the signal processing device 170 may be configured to sequentially transmit a plurality of display identification data to the external device 800 through the interface 130a.

Meanwhile, the signal processing device 170 may be configured to extract data sizes respectively from a plurality of decoded image data, select decoded image data with the largest data size among the extracted data sizes, and output the selected decoded image data to the display 180.

Meanwhile, the signal processing device 170 may include a plurality of decoders 325a, 325b, 325c, a video data selector 1105, and a video output interface 650.

Among the plurality of decoders 325a, 325b, 325c, the first decoder 325a may be a decoder based on the HDMI version 1.4, the second decoder 325b may be a decoder based on the HDMI version 2.1, and the third decoder 325c may be a decoder based on the HDMI version 2.1+VRR.

Meanwhile, the video data selector 1105 may extract color bit information, resolution information, or image data size information from image data decoded by the plurality of decoders 325a, 325b, 325c.

Then, the video data selector 1105 may select one of a plurality of decoded image data based on the color bit information, resolution information, or image data size information.

Meanwhile, in case in which the HDMI version information of the external device 800 matches a decoder within the signal processing device 170, the data size of decoded image data after decoding appears the largest.

Accordingly, the video data selector 1105 determines that the display identification data with the largest data size among a plurality of decoded image data is the one corresponding to the external device 800.

Meanwhile, the signal processing device 170 may be configured to decode first image data of first resolution using a plurality of decoders 325a, 325b, 325c upon receiving the first image data from the external device 800, select the first decoder 325a among the plurality of decoders 325a, 325b, 325c based on a plurality of decoded image data, and output image data output from the first decoder 325a on the display 180. Accordingly, an image may be stably displayed.

At this time, the first image data of the first resolution may be image data based on the HDMI version 1.4.

Meanwhile, the signal processing device 170 may be configured to decode second image data of second resolution using a plurality of decoders 325a, 325b, 325c upon receiving the second image data from the external device 800, select the second decoder 325b among the plurality of decoders 325a, 325b, 325c based on a plurality of decoded image data, and output image data output from the second decoder 325b on the display 180. Accordingly, an image may be stably displayed.

At this time, the second image data of the second resolution may be image data based on the HDMI version 2.1.

Meanwhile, the signal processing device 170 may be configured to decode third image data of third resolution using a plurality of decoders 325a, 325b, 325c upon receiving the third image data from the external device 800, select the third decoder 325c among the plurality of decoders 325a, 325b, 325c based on a plurality of decoded image data, and output image data output from the third decoder 325c on the display 180. Accordingly, an image may be stably displayed.

At this time, the third image data of the third resolution may be image data based on the HDMI version 2.1+VRR.

Meanwhile, in case in which the image output mode is changed from a normal color mode to a deep color mode or from the deep color mode to the normal color mode, the signal processing device 170 may be configured to sequentially transmit a plurality of display identification data to the external device 800 through the interface 130a.

Accordingly, since display identification data corresponding to the external device 800 may be automatically transmitted without involving displaying of the deep color off item 952 of FIG. 9B, an image may be stably displayed.

Meanwhile, in case in which the image output mode is changed from the normal color mode to a game mode or from the game mode to the normal color mode, the signal processing device 170 may be configured to sequentially transmit a plurality of display identification data to the external device 800 through the interface 130a.

Accordingly, since display identification data corresponding to the external device 800 may be automatically transmitted, an image may be stably displayed.

Meanwhile, in case in which the first decoder 325a is selected after a plurality of display identification data are sequentially transmitted, the signal processing device 170 may be configured to decode image data received from the external device 800 through the first decoder 325a corresponding to the first resolution and output the decoded image data to the display 180.

Meanwhile, if the resolution of image data decoded by the first decoder 325a becomes lower than a first reference value corresponding to the first resolution during the operation of the first decoder 325a after a plurality of display identification data are sequentially transmitted and the first decoder 325a is selected, the signal processing device 170 determines that an error has occurred and is configured to change the decoder in operation.

For example, the signal processing device 170 may decode image data received from the external device 800 through the first decoder 325a corresponding to the first resolution and, if it is determined that the resolution of the decoded image data is lower than the first reference value corresponding to the first resolution, may decode image data received from the external device 800 through the second decoder 325b corresponding to the second resolution.

Meanwhile, in case in which image data decoded by the second decoder 325b is stable, the signal processing device 170 may be configured to output image data decoded by the second decoder 325b to the display 180. Accordingly, an image may be stably displayed despite a change in the image data received from the external device 800.

Meanwhile, if the resolution of image data decoded by the second decoder 325b becomes lower than a second reference value corresponding to the second resolution during the operation of the second decoder 325b after a plurality of display identification data are sequentially transmitted and the second decoder 325b is selected, the signal processing device 170 determines that an error has occurred and is configured to change the decoder in operation.

For example, the signal processing device 170 may decode image data received from the external device 800 through the second decoder 325b corresponding to the second resolution and, if it is determined that the resolution of the decoded image data is lower than the second reference value corresponding to the second resolution, may decode image data received from the external device 800 through the third decoder 325c corresponding to the third resolution.

Meanwhile, in case in which image data decoded by the third decoder 325c is stable, the signal processing device 170 may be configured to output image data decoded by the third decoder 325c to the display 180. Accordingly, an image may be stably displayed despite a change in the image data received from the external device 800.

Meanwhile, the interface 130a may sequentially transmit a plurality of display identification data to the external device 800 through the display data channel line LNe of FIG. 7.

Meanwhile, after sequentially transmitting a plurality of display identification data, the interface 130a may receive image data from the external device 800 through a plurality of Transition Minimized Differential Signaling (TMDS) lines LNa-LNd of FIG. 7. Accordingly, an image may be stably displayed based on image data received from the external device 800.

Meanwhile, an image display apparatus 100 according to another embodiment of the present disclosure comprises a display 180, an interface 130a exchanging data with an external device 800, a memory 140 storing a plurality of display identification data, and a signal processing device 170 controlling to sequentially transmit the plurality of display identification data to the external device 800, receive image data corresponding to one of display identification data among the plurality of display identification data from the external device 800, and display an image corresponding to the received image data on the display 180.

Accordingly, an image may be stably displayed based on image data received from the external device 800. Furthermore, since a plurality of display identification data are transmitted, display identification data corresponding to image data transmitted from the external device 800 may be transmitted.

FIGS. 12A to 13D are diagrams referred to in the description of FIG. 11.

Figure 12A:
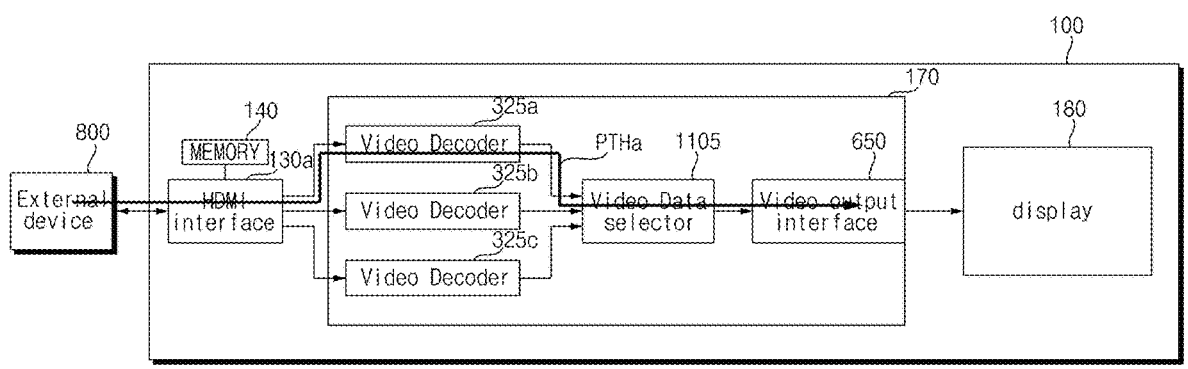
FIGS. 12A to 13D are diagrams referred to in the description of FIG. 11.

FIG. 12A assumes that the first decoder 325a is selected from among a plurality of decoders 325a, 325b, 325c.

Referring to the figure, the signal processing device 170 according to an embodiment of the present disclosure may be configured to select the first decoder 325a among a plurality of decoders 325a, 325b, 325c upon receiving the first image data of the first resolution from the external device 800 and output image data output from the first decoder 325a to the display 180.

In other words, as shown in the figure, an image is output to the display 180 via a path PTHa passing through the interface 130a, the first decoder 325a, the video data selector 1105, and the video output interface 650.

Accordingly, an image may be stably displayed based on image data received from the external device 800.

Figure 12B:
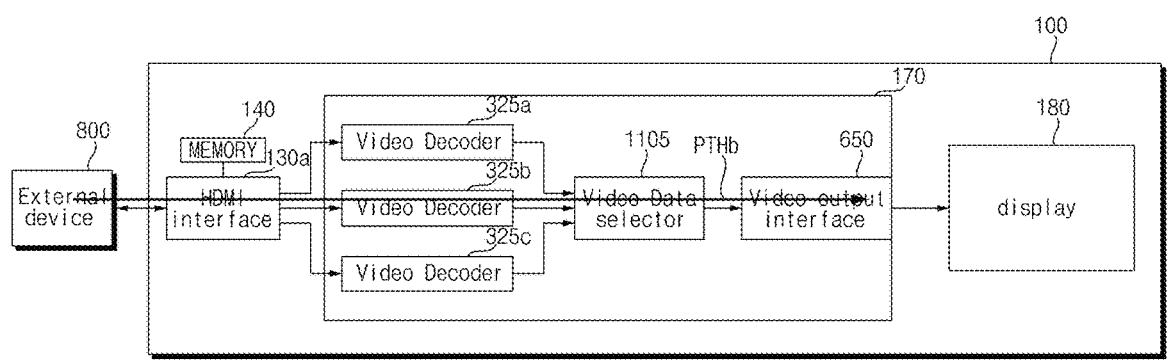

FIG. 12B assumes that the second decoder 325b is selected from among a plurality of decoders 325a, 325b, 325c.

Referring to the figure, the signal processing device 170 according to an embodiment of the present disclosure may be configured to select the second decoder 325b among a plurality of decoders 325a, 325b, 325c upon receiving the second image data of the second resolution from the external device 800 and output image data output from the second decoder 325b to the display 180.

In other words, as shown in the figure, an image is output to the display 180 via a path PTHb passing through the interface 130a, the second decoder 325b, the video data selector 1105, and the video output interface 650.

Accordingly, an image may be stably displayed based on image data received from the external device 800.

Figure 12C:
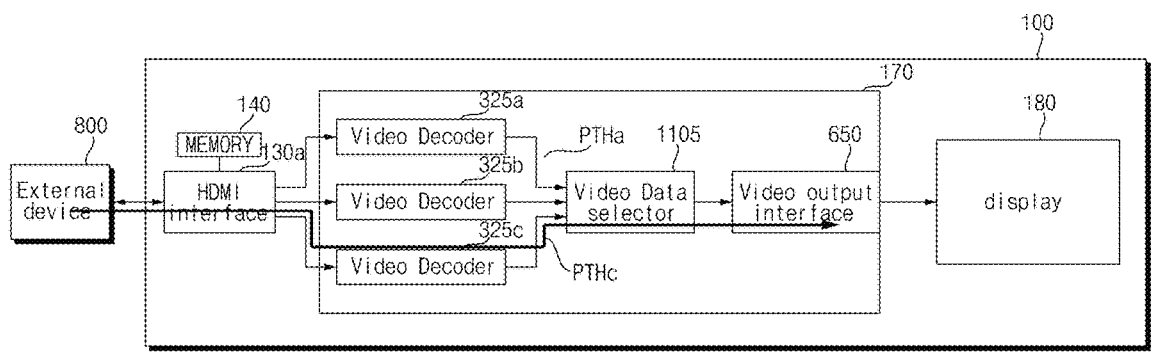

FIG. 12C assumes that the third decoder 325c is selected from among a plurality of decoders 325a, 325b, 325c.

Referring to the figure, the signal processing device 170 according to an embodiment of the present disclosure may be configured to select the third decoder 325c among a plurality of decoders 325a, 325b, 325c upon receiving the third image data of the third resolution from the external device 800 and output image data output from the third decoder 325c to the display 180.

In other words, as shown in the figure, an image is output to the display 180 via a path PTHc passing through the interface 130a, the third decoder 325c, the video data selector 1105, and the video output interface 650.

Accordingly, an image may be stably displayed based on image data received from the external device 800.

FIGS. 13A to 13D show examples of various input and output waveforms of the interface 130*a* in the image display apparatus 100.

Figure 13A:
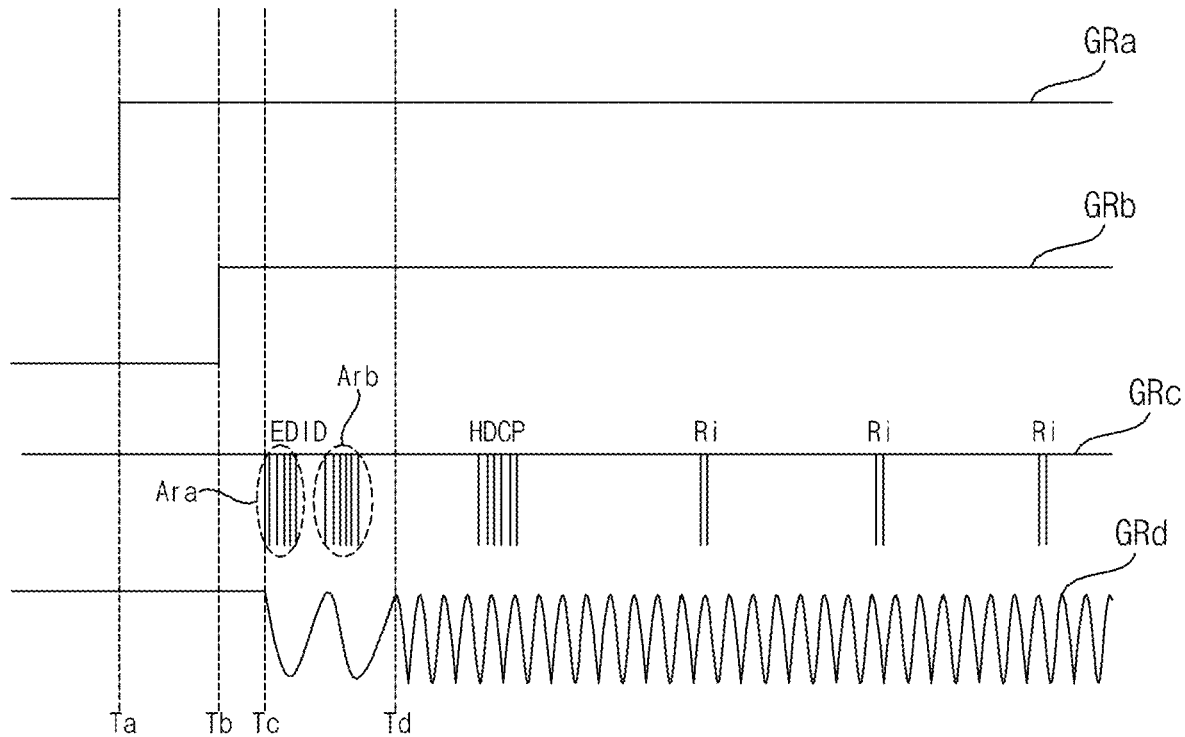

First, FIG. 13A shows one example of various input and output waveforms of the interface 130*a* in the image display apparatus 100.

Referring to the figure, the interface 130*a* of the image display apparatus 100 may receive a source voltage GRa in case in which an external device 800 is connected or power is turned on. At this time, the source voltage is a DC voltage, which is approximately 5V.

The figure assumes that, at the time of Ta, the external device 800 is connected or the connected external device 800 is turned on, and a high-level source voltage is received.

Meanwhile, the interface 130*a* of the image display apparatus 100 may transmit a hot plug detect (HPD) signal GRb through the HPD line LNh at the time of Tb after receiving the source voltage.

Meanwhile, the interface 130*a* of the image display apparatus 100 may sequentially transmit a plurality of display identification data through the display data transmission channel line LNe between the time Tc and the time Td after transmitting the hot plug detection (HPD) signal.

The figure assumes that two display identification data, labeled as Ara and Arb, are transmitted separately within the display data transmission channel waveform GRc.

At this time, the two display identification data may be the display identification data 910 based on the HDMI version 1.4 and the display identification data 915 or 920 based on the HDMI version 2.1.

Next, the interface 130*a* of the image display apparatus 100 may receive image data GRd through a plurality of TMDS lines LNa-LNd after the time Td.

As described above, since a plurality of display identification data are sequentially transmitted, display identification data corresponding to the image data transmitted from the external device 800 may be transmitted. Consequently, an image may be stably displayed based on image data received from the external device 800.

Figure 13B:
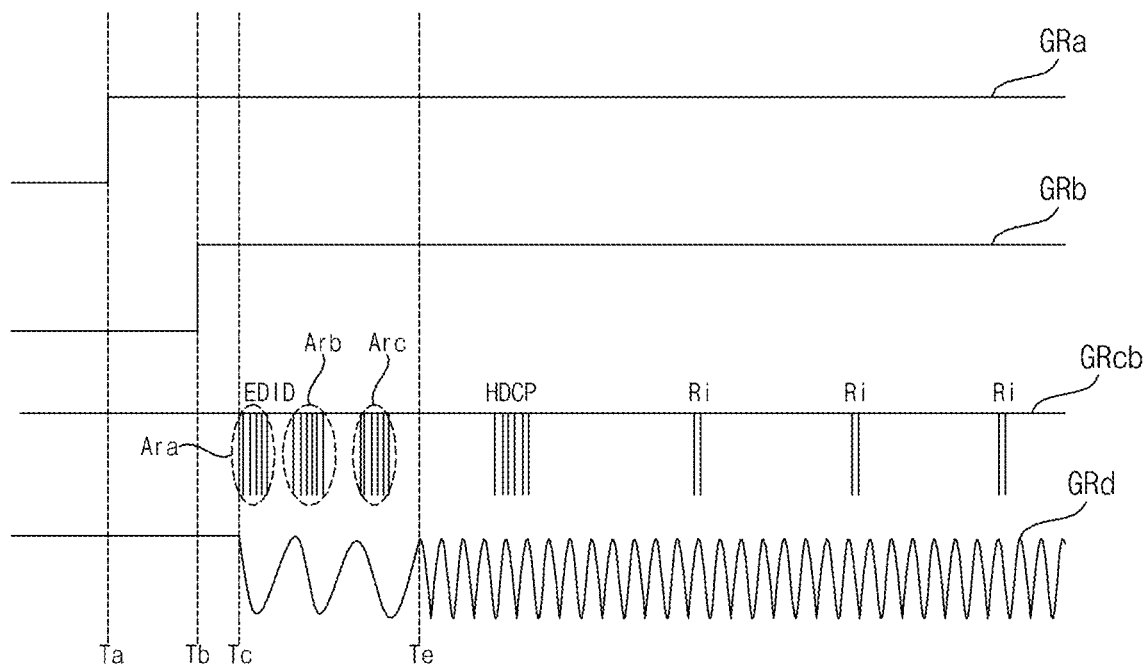

Next, FIG. 13B shows another example of various input and output waveforms of the interface 130*a* in the image display apparatus 100.

Referring to the figure, FIG. 13B is similar to FIG. 13A but with a difference that three display identification data are transmitted rather than two display identification data.

In other words, the interface 130*a* of the image display apparatus 100 may receive a source voltage GRa at the time of Ta in case in which the external device 800 is connected or power is turned on.

Meanwhile, the interface 130*a* of the image display apparatus 100 may transmit a hot plug detect (HPD) signal GRb through the HPD line LNh at the time of Tb after receiving the source voltage.

Meanwhile, the interface 130*a* of the image display apparatus 100 may sequentially transmit a plurality of display identification data through the display data transmission channel line LNe between the time Tc and the time Td after transmitting the hot plug detection (HPD) signal.

The figure assumes that three display identification data, labeled as Ara, Arb, and Arc, are transmitted separately within the display data transmission channel waveform GRcb.

At this time, the three display identification data may be the display identification data 910 based on the HDMI version 1.4, the display identification data 915 or 920 based on the HDMI version 2.1, and the display identification data 935 based on the HDMI version 2.1+VRR.

Next, the interface 130*a* of the image display apparatus 100 may receive image data GRd through a plurality of TMDS lines LNa-LNd after the time Te.

As described above, since three display identification data are sequentially transmitted, display identification data corresponding to the image data transmitted from the external device 800 may be transmitted. Consequently, an image may be stably displayed based on the image data received from the external device 800.

Meanwhile, as the number of display identification data transmitted from the image display apparatus 100 increases, the time interval between transmitting the high plug detection (HPD) signal and receiving image data may become extended.

Figure 13C:
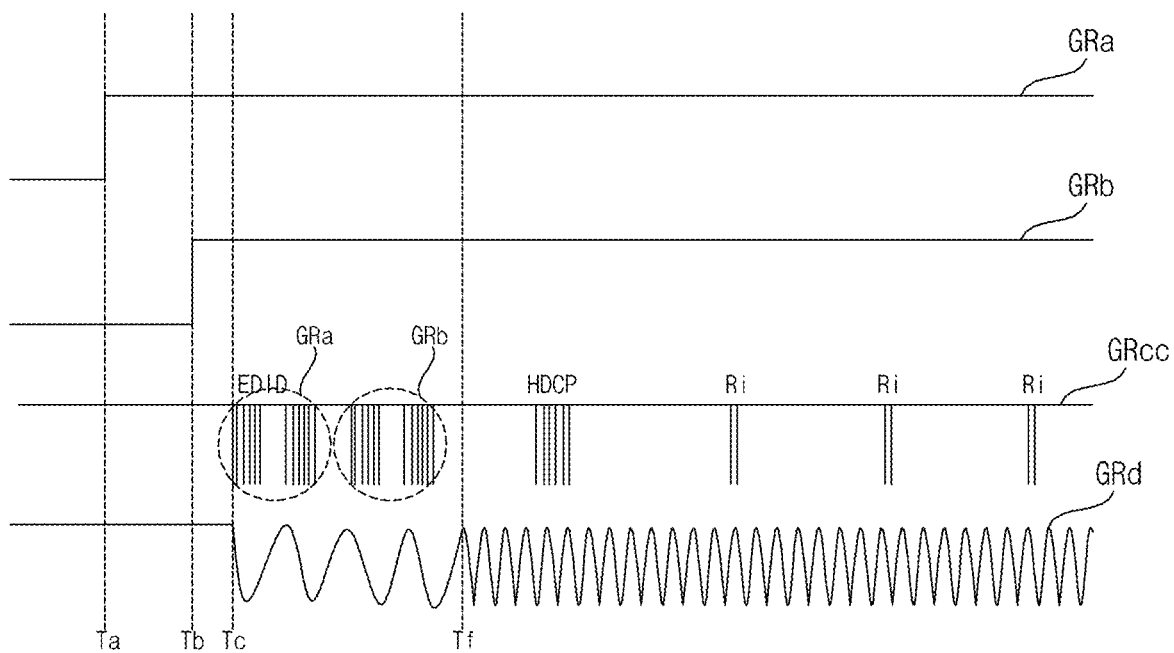

Next, FIG. 13C shows yet another example of various input and output waveforms of the interface 130*a* in the image display apparatus 100.

Referring to the figure, FIG. 13C shows a case in which two display identification data are transmitted like the case of FIG. 13A but shows a difference from FIG. 13A in that the display identification data are sequentially transmitted by being divided into base data and extended data.

Meanwhile, the interface 130*a* of the image display apparatus 100 may sequentially transmit a plurality of display identification data between the time Tc and the time Tf through the display data transmission channel line LNe after transmitting the hot plug detection (HPD) signal.

The figure shows an example in which two display identification data are transmitted by being divided into GRa and GRb within the display data transmission waveform GRcc.

Meanwhile, GRa may be sequentially transmitted by being divided into the base data and extended data; and GRb may be sequentially transmitted by being divided into the base data and extended data.

Next, the interface 130*a* of the image display apparatus 100 may receive image data GRd through a plurality of TMDS lines LNa-LNd after the time Tf.

As described above, since two display identification data GRa, GRb are sequentially transmitted, display identification data corresponding to the image data transmitted from the external device 800 may be transmitted. Consequently, an image may be stably displayed based on the image data received from the external device 800.

Figure 13D:
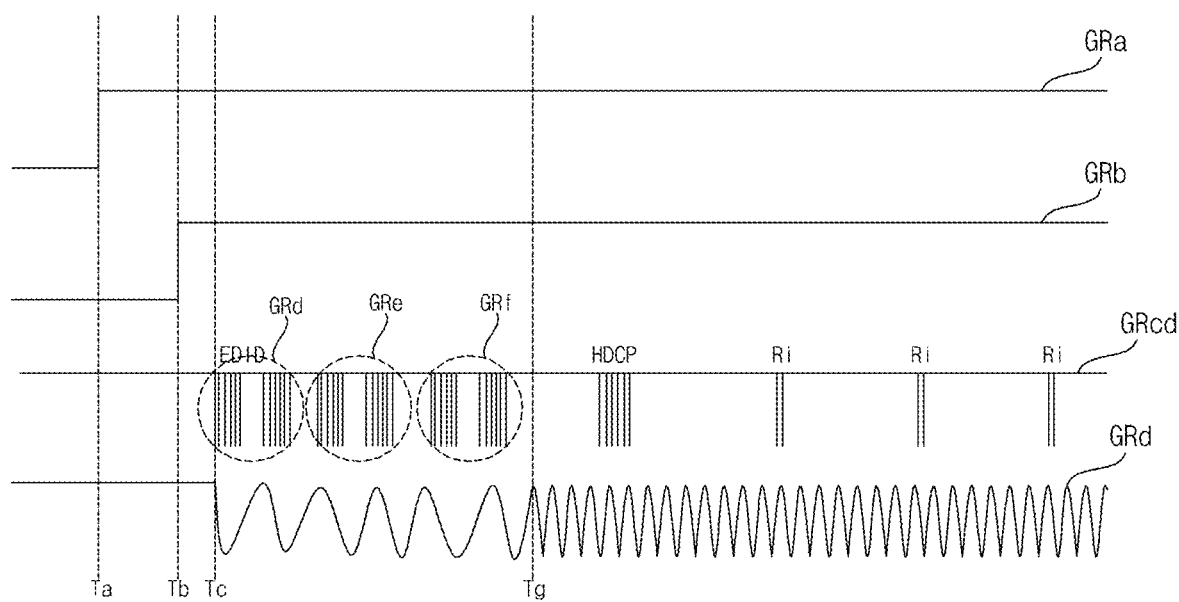

Next, FIG. 13D shows still another example of various input and output waveforms of the interface 130*a* in the image display apparatus 100.

Referring to the figure, FIG. 13D shows a case in which three display identification data are transmitted like the case of FIG. 13B but shows a difference from FIG. 13B in that the display identification data are sequentially transmitted by being divided into base data and extended data.

Meanwhile, the interface 130*a* of the image display apparatus 100 may sequentially transmit a plurality of display identification data between the time Tc and the time Tg through the display data transmission channel line LNe after transmitting the hot plug detection (HPD) signal.

The figure shows an example in which three display identification data are transmitted by being divided into GRd, GRe, and GRf within the display data transmission waveform GRcd.

Meanwhile, GRd may be sequentially transmitted by being divided into the base data and extended data; GRe may be sequentially transmitted by being divided into the base data and extended data; and GRf may be sequentially transmitted by being divided into the base data and extended data.

Next, the interface 130a of the image display apparatus 100 may receive image data GRd through a plurality of TMDS lines LNa-LNd after the time Tg.

As described above, since two display identification data GRa, GRb are sequentially transmitted, display identification data corresponding to the image data transmitted from the external device 800 may be transmitted. Consequently, an image may be stably displayed based on the image data received from the external device 800.

As described above, an image display apparatus according to an embodiment of the present disclosure comprises a display, an interface configured to exchange data with an external device, a memory configured to store a plurality of display identification data, and a signal processing device configured to transmit the plurality of display identification data to the external device at the time of connecting to the external device or changing an image output mode, decode image data received from the external device using a plurality of decoders, and select one of a plurality of decoded image data to be output on the display. Accordingly, an image may be stably displayed based on image data received from an external device. Furthermore, since a plurality of display identification data are transmitted, display identification data corresponding to image data transmitted from the external device may be transmitted.

Meanwhile, the signal processing device may be configured to sequentially transmit a plurality of display identification data to the external device through the interface. Accordingly, an image may be stably displayed based on image data received from an external device.

Meanwhile, the signal processing device may be configured to extract data sizes respectively from a plurality of decoded image data, select decoded image data with the largest data size among the extracted data sizes, and output the selected decoded image data to the display. Accordingly, an image may be stably displayed based on image data received from an external device.

Meanwhile, in case in which first image data of first resolution are received from the external device, the signal processing device may be configured to decode the first image data using the plurality of decoders, select a first decoder among the plurality of decoders based on a plurality of decoded image data, and output image data output from the first decoder to the display. Accordingly, an image may be stably displayed based on image data received from an external device.

Meanwhile, in case in which second image data of second resolution are received from the external device, the signal processing device may be configured to decode the second image data using the plurality of decoders, select a second decoder among the plurality of decoders based on a plurality of decoded image data, and output image data output from the second decoder to the display. Accordingly, an image may be stably displayed based on image data received from an external device.

Meanwhile, in case in which third image data of third resolution are received from the external device, the signal processing device may be configured to decode the third image data using the plurality of decoders, select a third decoder among the plurality of decoders based on a plurality of decoded image data, and output image data output from the third decoder to the display. Accordingly, an image may be stably displayed based on image data received from an external device.

Meanwhile, in case in which the image output mode is changed from a normal color mode to a deep color mode or from the deep color mode to the normal color mode, the signal processing device may be configured to sequentially transmit a plurality of display identification data to the external device. Accordingly, an image may be stably displayed based on image data received from an external device.

Meanwhile, in case in which the image output mode is changed from a normal mode to a game mode or from the game mode to the normal mode, the signal processing device may be configured to sequentially transmit a plurality of display identification data to the external device. Accordingly, an image may be stably displayed based on image data received from an external device.

Meanwhile, in case in which image data received from the external device is decoded through a first decoder corresponding to first resolution, and resolution of decoded image data is lower than a first reference value corresponding to the first resolution, the signal processing device may be configured to transmit the plurality of display identification data to the external device. Accordingly, an image may be stably displayed based on image data received from an external device.

Meanwhile, in case in which image data received from the external device is decoded through a first decoder corresponding to first resolution, and resolution of decoded image data is lower than a first reference value corresponding to the first resolution, the signal processing device may be configured to decode image data received from the external device through a second decoder corresponding to second resolution. Accordingly, an image may be stably displayed based on image data received from an external device.

Meanwhile, in case in which resolution of image data decoded by the second decoder is lower than a second reference value corresponding to the second resolution, the signal processing device may decode image data received from the external device through a third decoder corresponding to third resolution. Accordingly, an image may be stably displayed based on image data received from an external device.

Meanwhile, the interface may sequentially transmit a plurality of display identification data to the external device through a display data channel line. Accordingly, an image may be stably displayed based on image data received from an external device.

Meanwhile, after sequentially transmitting a plurality of display identification data, the interface may receive image data from the external device through a plurality of Transition Minimized Differential Signaling (TMDS) lines. Accordingly, an image may be stably displayed based on image data received from an external device.

An image display apparatus according to another embodiment of the present disclosure comprises a display, an interface configured to exchange data with an external device, a memory configured to store a plurality of display identification data, and a signal processing device configured to sequentially transmit the plurality of display identification data to the external device, receive image data corresponding to one of display identification data among the plurality of display identification data from the external device, and display an image corresponding to the received image data on the display. Accordingly, an image may be stably displayed based on image data received from an external device. Furthermore, since a plurality of display identification data are transmitted, display identification data corresponding to image data transmitted from the external device may be transmitted.

Meanwhile, the signal processing device may be configured to select a first decoder among a plurality of decoders in case in which first image data of first resolution are received from an external device and output image data output from the first decoder on the display. Accordingly, an image may be stably displayed based on image data received from an external device.

Meanwhile, the signal processing device may be configured to select a second decoder among a plurality of decoders in case in which second image data of second resolution are received from an external device and output image data output from the second decoder on the display. Accordingly, an image may be stably displayed based on image data received from an external device.

Meanwhile, the signal processing device may be configured to select a third decoder among a plurality of decoders in case in which third image data of third resolution are received from an external device and output image data output from the third decoder on the display. Accordingly, an image may be stably displayed based on image data received from an external device.

While the disclosure has been described with reference to the embodiments, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. An image display apparatus comprising:
   a display;
   an interface configured to exchange data with an external device;
   a memory configured to store a plurality of display identification data; and
   a signal processing device configured to transmit the plurality of display identification data to the external device at a time of connecting to the external device or changing an image output mode, decode image data received from the external device using a plurality of decoders, and select one of a plurality of decoded image data to be output on the display,
   wherein, in case in which the image data received from the external device is decoded through a first decoder corresponding to a first resolution, and a resolution of the decoded image data is lower than a first reference value corresponding to the first resolution, the signal processing device is configured to decode the image data received from the external device through a second decoder corresponding to second resolution.

2. The apparatus of claim 1, wherein the signal processing device is configured to sequentially transmit a plurality of display identification data to the external device through the interface.

3. The apparatus of claim 1, wherein the signal processing device is configured to extract data sizes respectively from a plurality of decoded image data, select decoded image data with a largest data size among the extracted data sizes, and output the selected decoded image data to the display.

4. The apparatus of claim 1, wherein, in case in which first image data of the first resolution are received from the external device, the signal processing device is configured to decode the first image data using the plurality of decoders, select the first decoder among the plurality of decoders based on a plurality of decoded image data.

5. The apparatus of claim 4, wherein, in case in which second image data of the second resolution are received from the external device, the signal processing device is configured to decode the second image data using the plurality of decoders, select the second decoder among the plurality of decoders based on a plurality of decoded image data.

6. The apparatus of claim 5, wherein, in case in which third image data of a third resolution are received from the external device, the signal processing device is configured to decode the third image data using the plurality of decoders, select a third decoder among the plurality of decoders based on a plurality of decoded image data, and output image data output from the third decoder to the display.

7. The apparatus of claim 1, wherein, in case in which the image output mode is changed from a normal color mode to a deep color mode or from the deep color mode to the normal color mode, the signal processing device is configured to sequentially transmit a plurality of display identification data to the external device.

8. The apparatus of claim 1, wherein, in case in which the image output mode is changed from a normal mode to a game mode or from the game mode to the normal mode, the signal processing device is configured to sequentially transmit a plurality of display identification data to the external device.

9. An image display apparatus comprising:
   a display:
   an interface configured to exchange data with an external device;
   a memory configured to store a plurality of display identification data; and
   a signal processing device configured to transmit the plurality of display identification data to the external device at a time of connecting to the external device or changing an image output mode, decode image data received from the external device using a plurality of decoders, and select one of a plurality of decoded image data to be output on the display,
   wherein, in case in which the image data received from the external device is decoded through a first decoder corresponding to a first resolution, and a resolution of the decoded image data is lower than a first reference value corresponding to the first resolution, the signal processing device is configured to transmit the plurality of display identification data to the external device.

10. The apparatus of claim 1, wherein, in case in which a resolution of the image data decoded by the second decoder is lower than a second reference value corresponding to the second resolution, the signal processing device decodes the image data received from the external device through a third decoder corresponding to third resolution.

11. The apparatus of claim 1, wherein the interface sequentially transmits a plurality of display identification data to the external device through a display data channel line.

12. The apparatus of claim 11, wherein, after sequentially transmitting a plurality of display identification data, the interface receives image data from the external device through a plurality of Transition Minimized Differential Signaling (TMDS) lines.

13. An image display apparatus comprising:
   a display;
   an interface configured to exchange data with an external device;
   a memory configured to store a plurality of display identification data; and
   a signal processing device configured to sequentially transmit the plurality of display identification data to the external device, receive image data corresponding to one of display identification data among the plurality of display identification data from the external device, and display an image corresponding to the received image data on the display, wherein the signal processing device is configured to select a first decoder among a plurality of decoders in case in which first image data of a first resolution are received from the external device and output image data output from the first decoder on the display, wherein the signal processing device is configured to select a second decoder among the plurality of decoders in case in which second image data of a second resolution are received from the external device and output image data output from the second decoder on the display.

14. The apparatus of claim 13, wherein, the signal processing device is configured to select a third decoder among the plurality of decoders in case in which third image data of a third resolution are received from an external device and output image data output from the third decoder on the display.

\* \* \* \* \*